(12) United States Patent
Okuyama

(10) Patent No.: US 7,408,950 B2
(45) Date of Patent: Aug. 5, 2008

(54) MULTIPLE NODE NETWORK AND COMMUNICATION METHOD WITHIN THE NETWORK

(75) Inventor: Takashi Okuyama, Shizuoka (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 1047 days.

(21) Appl. No.: 10/619,095

(22) Filed: Jul. 11, 2003

(65) Prior Publication Data

US 2004/0057450 A1      Mar. 25, 2004

(30) Foreign Application Priority Data

Jul. 11, 2002  (JP)  .............................. 2002-202032

(51) Int. Cl.
*H04L 12/413* (2006.01)

(52) U.S. Cl. .................. 370/447; 710/240; 710/309; 307/10.6

(58) Field of Classification Search ................ 370/400, 370/402, 407, 408, 447, 448, 461, 462; 710/309, 710/241, 244, 243; 307/10.6
See application file for complete search history.

(56) References Cited

U.S. PATENT DOCUMENTS

| | | | |
|---|---|---|---|
| 4,497,057 A | | 1/1985 | Kato et al. |
| 4,598,285 A | * | 7/1986 | Hoshen ...................... 370/448 |
| 4,692,918 A | | 9/1987 | Elliott et al. |
| 4,708,669 A | | 11/1987 | Kanno et al. ................... 440/1 |
| 4,734,065 A | | 3/1988 | Nakahama et al. ............. 440/1 |
| 4,796,206 A | | 1/1989 | Boscove et al. |
| 4,817,466 A | | 4/1989 | Kawamura et al. |
| 5,031,562 A | | 7/1991 | Nakase et al. |
| 5,230,643 A | | 7/1993 | Kanno |

(Continued)

FOREIGN PATENT DOCUMENTS

EP      0 962 871 A2      12/1999

(Continued)

OTHER PUBLICATIONS

NMEA 2000; Standard for Serial Data Networking of Marine Electronic Devices; Main Document; Version 1.000, Sep. 12, 2001; @NMEA 1999, 2000, 2001.

(Continued)

*Primary Examiner*—Hassan Kizou
*Assistant Examiner*—Bo Hui A Zhu
(74) *Attorney, Agent, or Firm*—Knobbe Martens Olson & Bear LLP

(57) ABSTRACT

A multiple node network includes a plurality of terminal nodes. A management node manages the terminal nodes. A bus connects the respective terminal nodes and the management node to one another. The respective terminal nodes and the management node communicate with each other using a frame that includes at least an identifier field and a data field. The data field has a discriminative number. Each terminal node transfers the frame to the management node. A contention between the terminal nodes is arbitrated by comparing the respective identifier fields of the terminal nodes. When the arbitration fails, each terminal node repeatedly transfers the frame to the management node after a delay time that is unique for the particular terminal node and that is calculated based upon the discriminative number in the data field.

22 Claims, 9 Drawing Sheets

U.S. PATENT DOCUMENTS

| | | | |
|---|---|---|---|
| 5,245,324 A | | 9/1993 | Jonker et al. |
| 5,311,172 A | * | 5/1994 | Sadamori .................... 370/448 |
| 5,325,082 A | | 6/1994 | Rodriguez |
| 5,352,138 A | | 10/1994 | Kanno |
| 5,481,261 A | | 1/1996 | Kanno ................... 340/870.16 |
| 5,619,726 A | * | 4/1997 | Seconi et al. ................. 710/22 |
| 5,782,659 A | | 7/1998 | Motose .......................... 440/1 |
| 5,852,789 A | | 12/1998 | Trsar et al. |
| 5,904,604 A | | 5/1999 | Suzuki et al. |
| 5,935,187 A | | 8/1999 | Trsar et al. |
| 6,055,468 A | | 4/2000 | Kaman et al. |
| 6,141,608 A | | 10/2000 | Rother |
| 6,216,083 B1 | | 4/2001 | Ulyanov et al. |
| 6,330,553 B1 | | 12/2001 | Uchikawa et al. |
| 6,377,879 B2 | | 4/2002 | Kanno .......................... 701/29 |
| 6,431,930 B1 | | 8/2002 | Holt ............................ 440/84 |
| 6,529,816 B1 | | 3/2003 | Yamaguchi et al. |
| 6,606,670 B1 | * | 8/2003 | Stoneking et al. ............. 710/14 |
| 2001/0049579 A1 | | 12/2001 | Fujino et al. |
| 2003/0046417 A1 | * | 3/2003 | Ellis .......................... 709/232 |
| 2003/0214953 A1 | * | 11/2003 | El-Demerdash et al. ..... 370/400 |

FOREIGN PATENT DOCUMENTS

| | | |
|---|---|---|
| JP | 10-011105 | 1/1998 |
| JP | 10-184429 | 7/1998 |
| JP | 10-184431 | 7/1998 |
| JP | 10-319950 | 12/1998 |
| JP | 11-343916 | 12/1999 |
| JP | 2000-076300 | 3/2000 |
| JP | 2000-108995 | 4/2000 |
| JP | 2000-313398 | 11/2000 |
| JP | 2001-119416 | 4/2001 |
| JP | 2001-236317 | 8/2001 |

OTHER PUBLICATIONS

NMEA 2000; Standard for Serial Data Networking of Marine Electronic Devices; Appendix A; Version 1.000; Sep. 12, 2001; @NMEA 1999, 2000, 2001.

NMEA 2000; Standard for Serial Data Networking of Marine Electronic Devices; Appendix B; @NMEWA 1999, 2000, 2001.

NMEA 2000; Standard for Serial Data Networking of Marine Electronic Devices; Appendix C; Version 1.000, Sep. 12, 2001, @NMEA 1999, 2000, 2001.

NMEA 2000; Standard for Serial Data Networking of Marine Electronic Devices; Appendix D; Version 1.000, Sep. 12, 2001, @NMEA 1999, 2000, 2001.

NMEA 2000; Standard for Serial Data Networking of Marine Electronic Devices; Appendix E; ISO 11783-5 Network Management.

NMEA 2000; Standard for Serial Data Networking of Marine Electronic Devices; Appendix F; ISO 11783-3 DataLink Layer.

NMEA 2000; Standard for Serial Data Networking of Marine Electronic Devices; Appendix G; ISO 11898 Controller Area Network.

International Standard; ISO 11783-5; Tractor and machinery for agriculture and forestry—Serial control and communications data network; Part 5: Network management; First edition May 1, 2001.

Co-pending U.S. Appl. No. 10/251,722, filed Sep. 20, 2002, entitled Engine Control System for Watercraft, inventor Isao Kanno, assigned to Sanshin Kogyo Kabushiki Kaisha.

Co-pending U.S. Appl. No. 10/247,919, filed Sep. 20, 2002, entitled Inspection System For Watercraft, inventors Takashi Okuyama and Isao Kanno, assigned to Sanshin Kogyo Kabushiki Kaisha.

Co-pending U.S. Appl. No. 10/255,042, filed Sep. 25, 2002, entitled Diagnostic System For Watercraft, inventors Isao Kanno and Hitoshi Motose, assigned to Sanshin Kogyo Kabushiki Kaisha.

Co-pending U.S. Appl. No. 10/254,818, filed Sep. 25, 2002, entitled Watercraft Management System, inventors Takashi Okuyama and Hitoshi Motose, assigned to Sanshin Kogyo Kabushiki Kaisha.

Co-pending U.S. Appl. No. 10/280,262, filed Oct. 24, 2002, entitled Watercraft Control Systems, inventors Isao Kanno and Takashi Okuyama, assigned to Sanshin Kogyo Kabushiki Kaisha.

Co-pending U.S. Appl. No. 10/281,390, filed Oct. 24, 2002, entitled Small Watercraft And Outboard Motor, inventor Isao Kanno, assigned to Sanshin Kogyo Kabushiki Kaisha.

* cited by examiner

MULTIPLE NODE NETWORK AND COMMUNICATION METHOD WITHIN THE NETWORK

PRIORITY INFORMATION

The present application is based on and claims priority under 35 U.S.C. § 119 to Japanese Patent Application No. 2002-202032, filed on Jul. 11, 2002, the entire content of which is expressly incorporated by reference herein.

BACKGROUND OF THE INVENTION

1. Field of the Invention

The present invention generally relates to a multiple node network and a communication method within the network. The present invention more particularly relates to a network having a plurality of terminal nodes and a management node that manages the terminal nodes and also to a communication method among the terminal nodes and the management node.

2. Description of Related Art

Computerized controls have become popular for various systems such as, for example, land vehicles and watercrafts in recent years. Components of the systems such as engines and navigation devices typically are connected with each other using a network. Such engines and navigation devices each have a terminal node on the network. A bus connects together the respective terminal nodes. A management node also is provided within the network and is connected to the bus to manage the terminal nodes.

The terminal nodes and the management node frequently communicate with each other through the bus. Generally, the bus is common to all of the nodes. In some particular transfers, two or more nodes, which simultaneously are trying to communicate, place their own frames onto the bus and a contention thus occurs between the nodes. A protocol can be provided in this communication system to arbitrate the nodes in contention. One node that wins in the arbitration only has the priority to transfer the frame. Another node that loses in the arbitration should wait until an opportunity to use the bus exists. For example, JP2001-119416A discloses a network that has such a protocol.

In such a conventional network, the nodes can use a particular frame that has at least an identifier field to communicate with each other. The identifier field can include a classification identifier or ID of each node. If two or more nodes simultaneously try to transfer the frames, the identifier field of each frame is compared with one another. In general, the respective components have different identifiers. The arbitration thus is effected and the node that has won can obtain the priority.

Watercraft, however, can employ a plurality of outboard drives such as, for example, outboard motors to propel the watercraft at significant speed. Typically, the outboard motors are controlled by the same application program because there is no reason to provide a separate communication system for the outboard motors. Drive nodes for the outboard motors thus have the same classification identifier.

Under the circumstances, the terminal nodes first transfer the frames to the management node to obtain a network address when the network is switched on. If two or more nodes simultaneously place the frames onto the bus, the identifier field of each frame is compared with one another as described above. The comparison, however, does not successfully arbitrate the contention because the identifier of each drive node is the same as one another. The arbitration thus fails. Accordingly, the network requires a large amount of time to boot up.

SUMMARY OF THE INVENTION

A need therefore exists for an improved network that can boot up quickly and for an improved communication method that can contribute to the quick boot up of the network.

In accordance with one aspect of the present invention, a multiple node network comprising a plurality of terminal nodes, a management node that at least initially manages the terminal nodes, and a bus that is arranged to connect the respective terminal nodes and the management node to one another. The terminal nodes and the management node communicate with one another using a respective frame that includes at least an identifier field and a data field. At least some of the terminal nodes transfers a frame to the management node in which the data field contains a discriminative code. The management node arbitrates any contention between one or more of terminal nodes by comparing the identifier field of one terminal node in contention with the identifier filed of another terminal node in contention. At least some of the terminal nodes are capable of calculating a time delay based upon at least a portion of the discriminative code in the date field when arbitration fails and then re-transferring the frame to the management node after the time delay.

In accordance with another aspect of the present invention, a multiple node network comprises a plurality of terminal nodes, each of which communicates with a component of a system. A management node communicates with the terminal nodes and a bus is arranged to connect the terminal nodes and the management node to one another. The terminal nodes initially communicating with the management node using a respective frame that includes at least a data field having a discriminative number allotted to the component. At least some of the terminal nodes transfer the frame to the management node. Additionally, at least some of the terminal nodes are capable of re-transferring the frame to the management node after a time delay that is calculated based upon at least a portion of the discriminative number when a plurality of the terminal nodes have simultaneously transferred the respective frames to the management node.

An additional aspect of the present invention involves a communication method between a plurality of nodes in a network, wherein the nodes include terminal nodes and a management node that is configured to communicate with the terminal nodes. The method comprises creating a frame that includes at least an identifier field and a data field where the data field has a discriminative code. The respective frames are transferred to the management node from at least a plurality of the terminal nodes. The identifier field of one terminal node is compared with the identifier field of another terminal node to arbitrate between the terminal nodes in contention when the terminal nodes simultaneously transfer the respective frames to the management node. It then is determined whether the arbitration failed. If so, a time delay is calculated based upon at least a portion of each one of the discriminative codes. After the expiration of the calculated time delay, the frames are sent by the terminal nodes to the management node.

In accordance with a further aspect of the present invention, a communication method between a plurality of nodes in a network is provided. The nodes include terminal nodes and a management node configured to manage the terminal nodes. Each one of the terminal nodes is associated with a component of a system. The method comprises creating a frame that includes at least a data field-having a discriminative number allotted to the component, transferring the frame to the management node from at least some of terminal nodes, repeating the transferring of the frames to the management node from a plurality of terminal nodes when a contention arises that cannot be solved by arbitration, calculating a time delay based upon at least a portion of the discriminative number, and delaying the repeated transfer of the frames from the terminal nodes in contention by the calculated delay time.

BRIEF DESCRIPTION OF THE DRAWINGS

The foregoing and other features, aspects and advantages of the present invention are described in detail below with reference to the drawings of a preferred embodiment which is intended to illustrate and not to limit the invention. The drawings comprise nine figures in which.

DETAILED DESCRIPTION OF THE PREFERRED EMBODIMENT OF THE INVENTION

Figure 1:
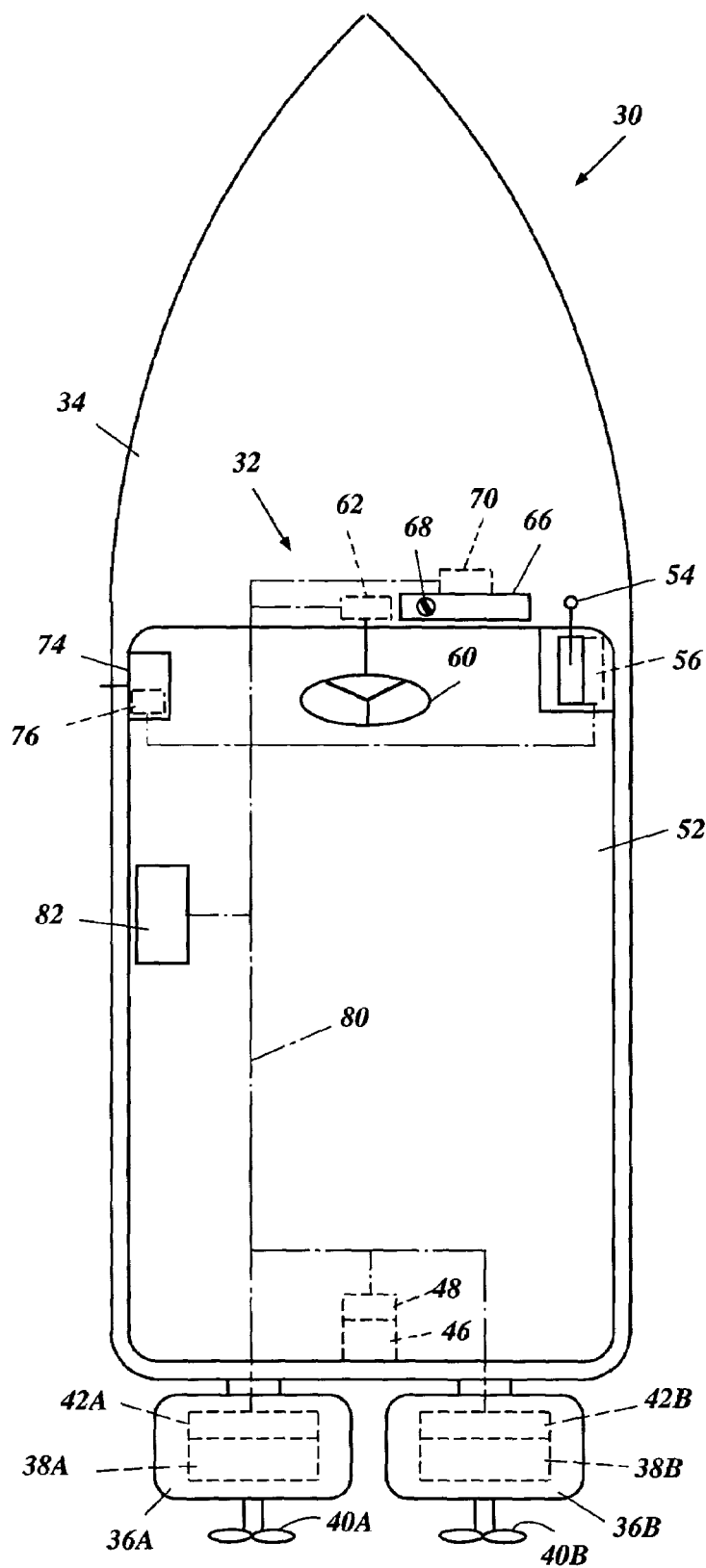
FIG. 1 illustrates a schematic representation of a top plan view of a watercraft propelled by a pair of outboard motors and provided with a controller area network (CAN) configured in accordance with certain features, aspects and advantages of the present invention.

With reference to FIG. 1, a watercraft 30 and a controller area network (CAN) 32 for the watercraft 30 is described. The CAN 32 is one type of a local area network (LAN). While a network is described in connection with this particular type of network (i.e., the CAN 32) for the particular type of system (e.g., the watercraft 30), those of skill in the art will appreciate that the present invention may have utility in a wide range of applications for other types of networks that are used for other systems such as, for example, land vehicles, toys, game machines, factory control systems, building management systems or the like.

The watercraft 30 has a hull 34. At least one drive unit propels the bull 34. In the illustrated embodiment, a pair of outboard motors 36A, 36B preferably are mounted on a transom of the hull 34 as the drive units to propel the hull 34. Other marine drives such as, for example, stern drives can replace the outboard motors 36A, 36B. Each outboard motor 36A, 36B incorporates a prime mover. The prime mover in the illustrated embodiment is an internal combustion engine 38A, 38B. Other types of prime movers such as, for example, electric motors can replace the engines 38A, 38B in other embodiments.

Each engine 38A, 38B incorporates one or more throttle valves in an air intake system to regulate a rate of airflow amount delivered to combustion chambers of the engine 38A, 38B. A throttle valve actuator preferably is coupled with valve shafts or a common valve shaft of the throttle valves to actuate the throttle valves. The throttle valve actuator can be formed with an electric motor or stepper motor, for example. Normally, the greater the throttle valve opens, the higher the rate of airflow amount into the engine and the higher the engine speed.

Each engine 38A, 38B preferably is provided with a fuel injection system that has fuel injectors spraying fuel directly into the combustion chambers or into a portion of the air intake system for combustion in the combustion chambers. Each engine 38A, 38B also is provided with an ignition or firing system that has spark plugs to ignite air/fuel charge in the combustion chambers of the engine.

Each outboard motor 36A, 36B has a propulsion unit that is powered by the engine 38A, 38B. The propulsion unit preferably is a propeller 40A, 40B. Other types of propulsion units such as, for example, a dual counter-rotating system or a hydrodynamic jet can replace the propeller 40A, 40B in other embodiments.

The outboard motor 36A, 36B also has a changeover mechanism (a transmission) that sets the propeller 40A, 40B for either forward, neutral or reverse operation. Each changeover mechanism preferably incorporates a changeover actuator to switch the changeover mechanism among forward, neutral and reverse positions that correspond to the forward, neutral and reverse operations of the propeller 40A, 40B, respectively. The changeover actuator can be formed with an electric motor, for example. The watercraft 30 proceeds forward when each propeller 40A, 40B is set in the forward operation, while the watercraft 30 proceeds backward when each propeller 40A, 40B is set in the reverse operation. The propellers 40A, 40B do not drive the watercraft when they are set for neutral operation.

In the illustrated embodiment, each outboard motor 36A, 36B is rotatable relative to the transom of the hull 34 to steer the watercraft 30. A steering actuator such as, for example, an electric motor is provided at each outboard motor 36A, 36B. The outboard motors 36A, 36B pivot about respective steering axes that lie generally vertical. Preferably, the steering movements of both the motors 36A, 36B are synchronized. In one variation, the outboard motors 36A, 36B are mechanically linked to move together in the same steering range. Additionally, each outboard motor 36A, 36B can be tiltable about a generally horizontal tilt axis.

Each outboard motor 36A, 36B has a drive node 42A, 42B electrically coupled with the throttle valve actuator, the fuel injectors, the spark plugs, the changeover actuator and the steering actuator. In one variation of the illustrated embodiment, each outboard motor 36A, 36B can have an engine node electrically coupled with the throttle valve actuator, the fuel injectors and the spark plugs and also a propulsion node electrically coupled with the changeover actuator and the steering actuator. That is, the drive node can be divided into the engine node relating to the engine components such as the throttle valve actuator and the propulsion node relating to the propulsion components such as the changeover actuator. Further groupings or divisions of the outboard motor components are also possible in order to suit a particular application.

A watercraft velocity sensor 46 preferably is mounted on a bottom of the hull 34 at or near the stern of the watercraft 30. The velocity sensor 46 preferably incorporates a Pitot tube and senses a water pressure in the tube to detect a velocity of the watercraft 30; however, other types of speed sensors (e.g., a paddle wheel sensor) can also be used. The velocity sensor 46 has a velocity sensor node 48 to transfer velocity data to the network 32.

In the illustrated embodiment, a passenger's area 52 is defined in the hull 34 from the transom to a mid portion of the hull 34. A remote controller 54 preferably is provided at a forward-most end of the passenger's area on the right-hand side. The illustrated remote controller 54 has a single control lever that is pivotally movable about a fulcrum to control both the throttle valve actuator and the changeover actuator. An operator can operate the control lever to set a desirable watercraft speed and to select one of the forward, neutral and reverse operations for the propeller 40A, 40B. The remote controller 54 has a remote controller node 56 to transfer throttle valve position control data and changeover position control data that represent how fast and in which direction the operator wants to move.

In a variation of this embodiment, the remote controller 54 can have two control levers, each of which separately controls the throttle valve actuator and the changeover actuator. In another variation, stick or sticks which slidably move can replace the control lever or levers, respectively.

A steering device 60 preferably is placed next to the remote controller 54. The illustrated steering device 60 incorporates a steering wheel mounted on the hull 34 for pivotal movement. The steering device 60 changes the steering positions of the respective outboard motors 36A, 36B. The operator can operate the steering wheel to steer the outboard motors 36A, 36B. The steering device 60 has a steering node 62 to transfer steering position control data that represent the operator's desire to the network. The steering device, however, can take other forms, such as, for example, but without limitation, a handlebar, a joystick, or a yoke.

A display panel 66 is disposed at or near the forward-most end of the passenger's area 52. In the illustrated embodiment, the display panel 66 is located between the remote controller 54 and the steering device 60 on the hull 34. The illustrated display panel 66 indicates an engine speed, a watercraft velocity, a changeover position, a direction of travel (e.g., north, northwest, etc.) and other information that is informative when operating the watercraft 30. Additionally, in the illustrated embodiment, a switch key recess 68 to receive a switch key is formed in an area of the display panel 66. A main switch unit is formed under the panel 66. The operator inserts the switch key into the switch key recess 68 and rotates the switch key to turn the main switch unit on. The display panel 66 has a display node 70. The main switch unit also is electrically coupled with the display node 70.

A fish-finder 74 preferably is placed at or near the forward-most end of the passenger's area and, in the illustrated embodiment, it is located on the left-hand side opposing to the remote controller 54. The fish-finder 74 can be used when fishing or diving, for example. The fish-finder 74 has a fish-finder node 76.

A bus or bus line 80 connects the drive nodes 42A, 42B, the velocity sensor node 48, the remote controller node 56, the steering node 62, the display node 70 and the fish-finder node 74 with each other to form the CAN 32. The drive nodes 42A, 42B, the velocity sensor node 48, the remote controller node 56, the steering node 62, the display node 70 and the fish-finder node 74 are terminal nodes of the CAN 32. A management node 82 also is connected to the bus 80 to manage the terminal nodes 42A, 42B, 48, 56, 62, 70, 76.

The illustrated bus 80 preferably is formed with twisted pair cables. Each terminal node 42A, 42B, 48, 56, 62, 70, 76 transfers a frame (e.g., a packet of information together with other fields, such as, for example, a header or possibly a trailer, that contain information that allows the packet to be forwarded to its destination on the network) to communicate with each other using the common bus 80. In other words, a multi-processing communication is made among the terminal nodes 42A, 42B, 48, 56, 62, 70, 76. An access protocal such as, for example, a carrier sense multiple access/collision detection (CSMA/CD) method preferably is used in this network communication system.

The bus level of the bus 80 can be the logical value "0" or the logical level "1." The logical value "0" is the dominant level of the bus 80 and is set when at least one of the nodes that is connected to the bus 80 outputs the logical value "0." The logical value "1" is the recessive level of the bus 80 and is set when all the nodes connected to the bus 80 output the logical value "1."

The bus 80 can be connect to the nodes 42A, 42B, 48, 56, 62, 70, 76, 82 in any forms such as, for example, a ring form and a star form. The bus 80 can use any cables or wires other than the twisted pair cables such as, for example, optical cables. Furthermore, a radio type bus (e.g., RF signal system) that has no cables or wires can replace the illustrated bus 80.

The CAN 32 preferably includes an electric power source such as, for example, one or more batteries to supply electric power at least to some or all of the nodes 42A, 42B, 48, 56, 62, 70, 76, 82. The power source can be used for other devices and electric components related to the outboard motors 36A, 36B and/or the watercraft 30. In the illustrated embodiment, the power source is in a state to supply all of the nodes 42A, 42B, 48, 56, 62, 70, 82, except for the fish-finder node 76, when the main switch unit is turned on. The illustrated fish-finder 74 has an own switch to activate the fish-finder 74 and the fish-finder node 76.

Figure 2:
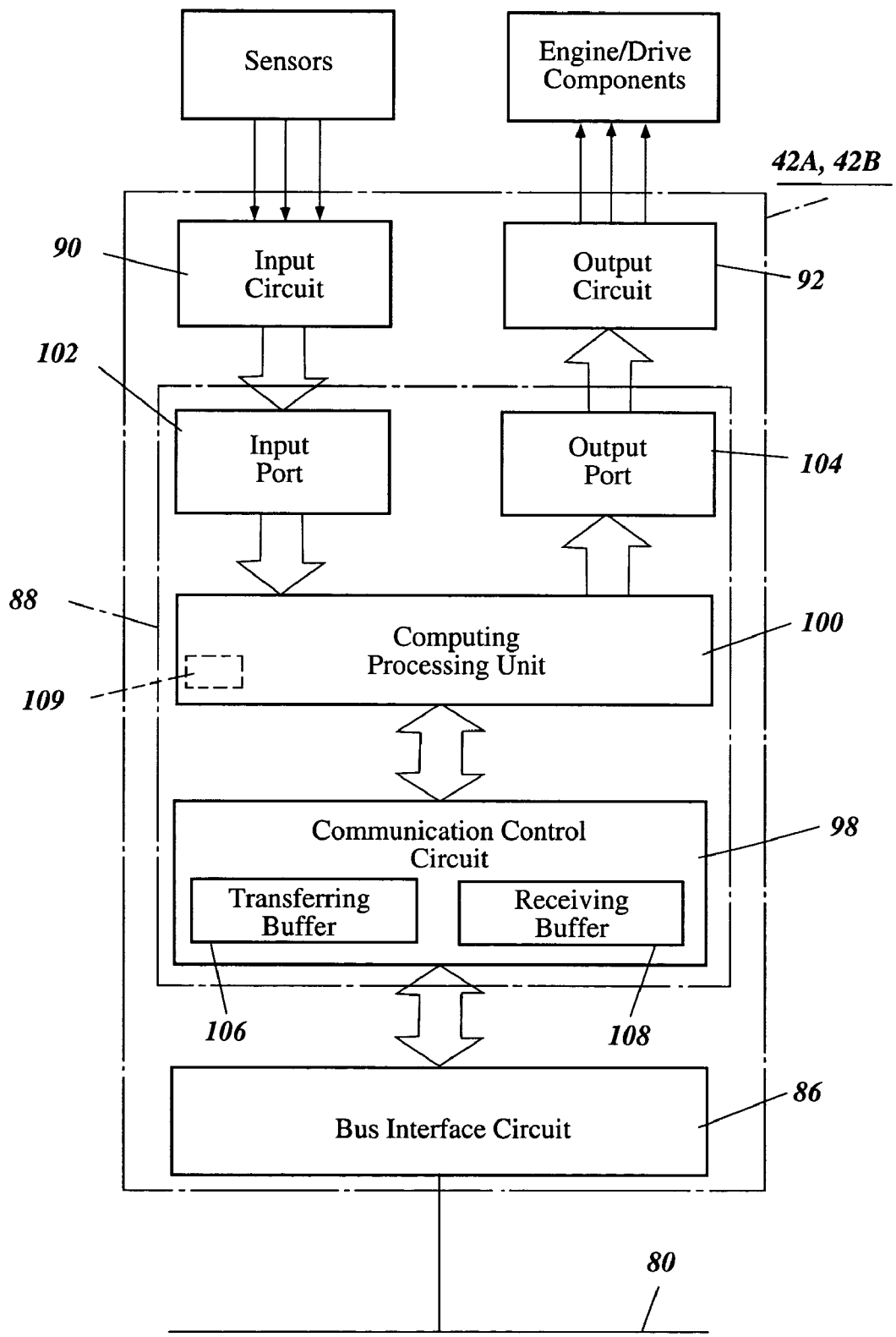
FIG. 2 illustrates a block diagram of a terminal node and, more specifically, a drive node that is a member of the network and is provided at each outboard motor in the illustrated embodiment.

With reference to FIG. 2, each drive node 42A, 42B comprises a bus interface circuit 86, a micro-computer 88, an input circuit 90 and an output circuit 92. The micro-computer 88 is a central processor of the drive node 42A, 42B and includes a communication control circuit 98, a computing processing unit 100, an input port 102 and an output port 104.

The micro-computer 88 is connected to various sensors through the input circuit 90. In the illustrated embodiment, the sensors include a throttle valve position sensor that detects an actual position of the throttle valves, an engine speed sensor and other sensors (e.g., an air pressure sensor and/or an air temperature sensor) that sense engine/drive conditions. The input circuit 90 receives actual throttle valve position data from the throttle valve position sensor, engine speed data from the engine speed sensor and other control data, if any, from the other sensors and send the data to the input port 102.

The input port 102 receives the actual throttle valve position data, engine speed data and other control data, if any, from the inlet circuit 90 and passes those data over to the computing processing unit 102. The conversion from an analog signal to a digital signal can occur in the input circuit 90 or at the individual sensor.

The micro-computer 88 also is connected to engine/drive (i.e., engine and/or outboard motor) components through the output circuit 92. The engine/drive components at least include the throttle valve actuator, the fuel injectors, the spark plugs, the changeover actuator and the steering actuator. The output port 104 receives control data from the computing processing unit 100 and passes the data over to the output circuit 92. The output circuit 92 then transfers the control data to the engine/drive components. Preferably, the engine/drive components include their own drive and/or power/charging circuits that respond to the control data sent from the device node; however, in some applications, such circuits for the various engine and outboard motor components (e.g., the throttle actuator) can be built into the output circuit 92. For example, in the illustrated embodiment, the engine includes a separate charging circuit for the spark plugs. The output circuit 92 sends the control data to the charging circuit to instruct when to cause each spark plug to discharge and ignite the charge in the respective combustion chamber. In other forms, however, such a charging circuit can be integrated into the output circuit 92.

Within the microprocessor 88, the computing processing unit 100 communicates with the communication control circuit 98 that has a transferring buffer 106 and a receiving buffer 108. The communication control circuit 98 is connected to the bus 80 through the bus interface circuit 86.

The computing processing unit 100 incorporates at least one non-volatile storage or memory 109 such as, for example, ROM or EPROM. The non-volatile storage 109 preferably stores a classification identifier or ID allotted to the drive node 42A, 42B and each product or part number, manufacturing number and manufacturer model number of the outboard motor 36A, 36B. The classification identifier preferably is a serial number. Both the drive nodes 42A, 42B are assigned with the same classification identifier because the drive nodes 42A, 42B belong to the same classification. The product or parts number and the manufacturing number of one outboard motor 36A, 36B are discriminative with those of another outboard motor 36A, 36B. The manufacturer number may be the same as one another if the outboard motor 36A, 36B are manufactured by the same manufacturer. The product or parts number, the manufacturing number and the manufacturer number can be those of the engine 38A, 38B or other components or parts of the outboard motor 36A, 36B.

The computing processing unit 100 also incorporates one or more volatile storages such as, for example, RAM to store a network address (e.g., a physical address) that will be assigned from the management node 82 to each terminal node.

The drive nodes 42A, 42B preferably have higher ranked communication priority in the CAN 32 than the other terminal nodes 48, 56, 62, 70, 74 because the drive nodes 42A, 42B directly affect an operation of the engine 38A, 38B or an operation of the outboard motor 36A, 36B. In order to realize the higher ranked priority, the frame of the drive nodes 42A, 42B preferably has a larger number of dominants (e.g., logical level "0") and the dominants preferably appear earlier than recessive in the sequential order. Any bus arbitration protocal that assigns a priority level to different devices can also be used.

The micro-computer 88 of each drive node 42A, 42B and, particularly, the computing processing unit 100, controls the throttle valve position and the changeover position based upon the throttle valve position control data and the changeover position control data, respectively, that are sent by the remote controller node 56. The computing processing unit 100 also controls the steering position based upon the steering position control data sent by the steering node 62. Furthermore, the computing processing unit 100 calculates fuel injection timing and injection duration for the fuel injectors and ignition timing for the spark plugs based upon, at least in part, the watercraft velocity data transferred from the velocity sensor node 48 and the actual throttle valve position data and the engine speed data transferred from the throttle valve sensor and the engine speed sensor, respectively. The micro-computer 88 of the drive nodes 42A, 42B then controls the fuel injectors and the spark plugs using the calculated results.

The drive nodes 42A, 42B also transfer the actual throttle valve position data and the actual changeover position data and additionally engine speed data to the display node 70 through the bus 80. Those data are indicated on the display panel 70.

Each drive node 42A, 42B has a delay timer that measures an elapsed time TL after an error frame, which will be described below, is transferred, and a timer set counter that counts the number of times that the delay timer works. The computing processing unit 100 preferably incorporates the delay timer and the timer set counter.

Figure 3:
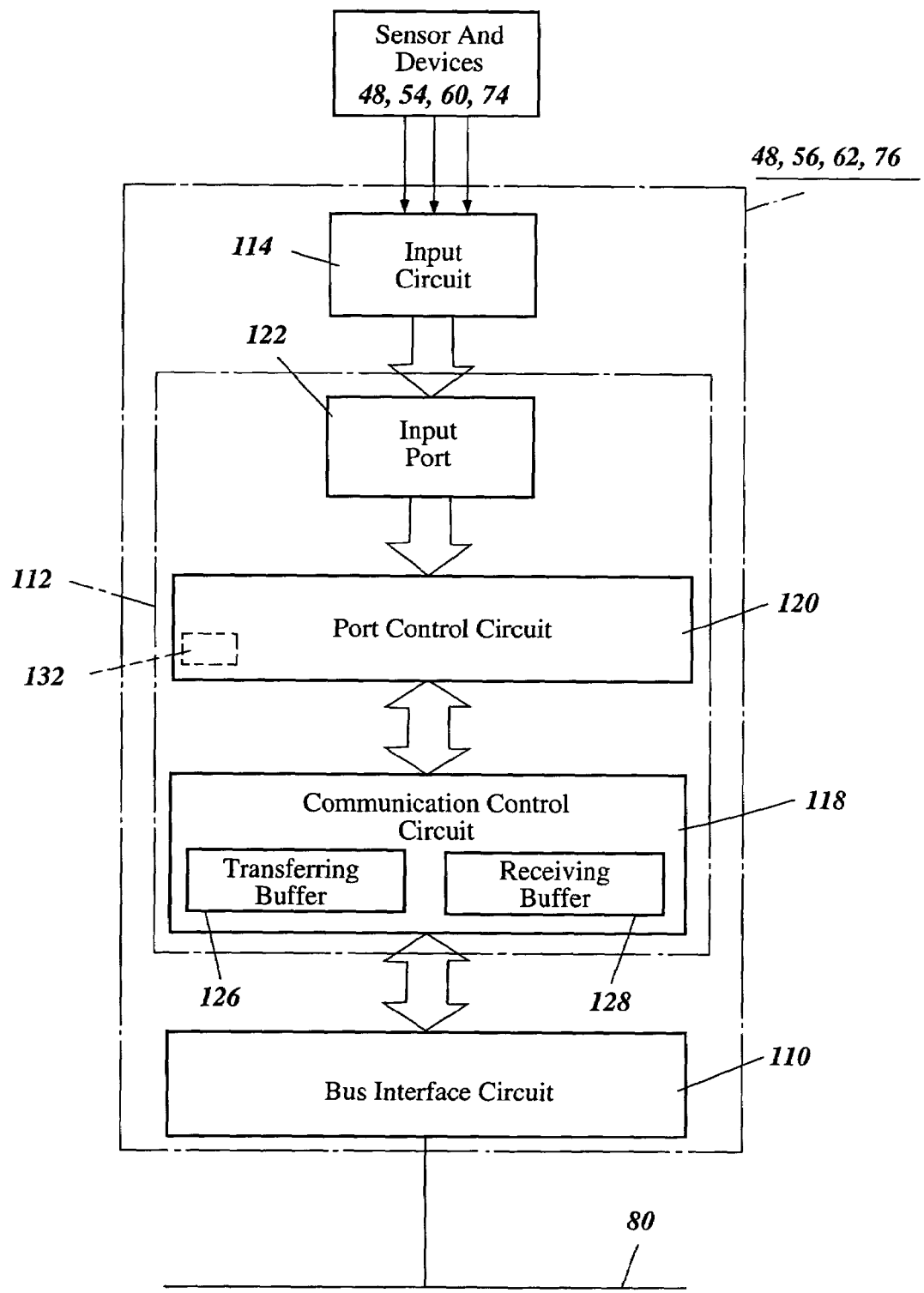
FIG. 3 illustrates a block diagram of another terminal node that represents any one of various nodes of the network, such as, for example, a velocity sensor node, a remote controller node, a steering angle sensor node and a fish-finder node that are members of the network and are provided at a velocity sensor, a remote controller, a steering angle sensor and a fish-finder, respectively, of the watercraft.

With reference to FIG. 3, the velocity sensor node 48, the remote controller node 56, the steering node 62 and the fish-finder node 76 each comprise the same node structure illustrated in FIG. 3. This node structure comprises a bus interface circuit 110, a micro-computer 112 and an input circuit 114. The micro-computer 112 is a central processor in each node 48, 56, 62, 76 and includes a communication control circuit 118, a port control circuit 120 and an input port 122.

The micro-computer 112 is connected to the respective sensor (the velocity sensor 48, the remote controller 54, the steering device 60 or the fish-finder 74) through the input circuit 114. The input circuit 114 receives data from the respective sensor—watercraft velocity data from the velocity sensor 48, throttle valve position control data and changeover position control data from the remote controller 56, steering position control data from the steering device 60 or fish finding data from the fish-finder 74—and sends the data to the input port 122.

The input port 122 receives the data (the watercraft velocity data, the throttle valve position and changeover position control data, the steering position control data or the fish finding data) from the inlet circuit 114 and passes the data over to the port control circuit 120.

Within the micro-processor 112, the port control unit 120 communicates with the communication control circuit 118 that has a transferring buffer 126 and a receiving buffer 128. The communication control circuit 118 is also connected to the bus 80 through the bus interface circuit 110.

The port control circuit 120 incorporates at least one non-volatile storage or memory 132 such as, for example, ROM or/EPROM. The non-volatile storage 132 preferably stores at least a classification identifier or ID allotted to the respective one of the velocity sensor node 48, the remote controller node 56, the steering node 62 or the fish-finder node 76, and a product or parts number, manufacturing model number and a manufacturer number of the velocity sensor 46, the remote controller 54, the steering device 60 and the fish-finder 74. The identifier preferably is a serial number.

The port control circuit 120 also incorporates one or more volatile storages such as, for example, RAM to store a network address (e.g., a physical address) that will be assigned from the management node 82 to the respective nodes 48, 56, 62 and 76.

Each node 48, 56, 62, 76 has a delay timer (not shown) that measures an elapsed time TL after the error frame is transferred. The node 48, 56, 62, 76 also has a timer set counter that counts the number of times that the delay timer works. The port control circuit 120 preferably incorporates the delay timer and the timer set counter.

Figure 4:
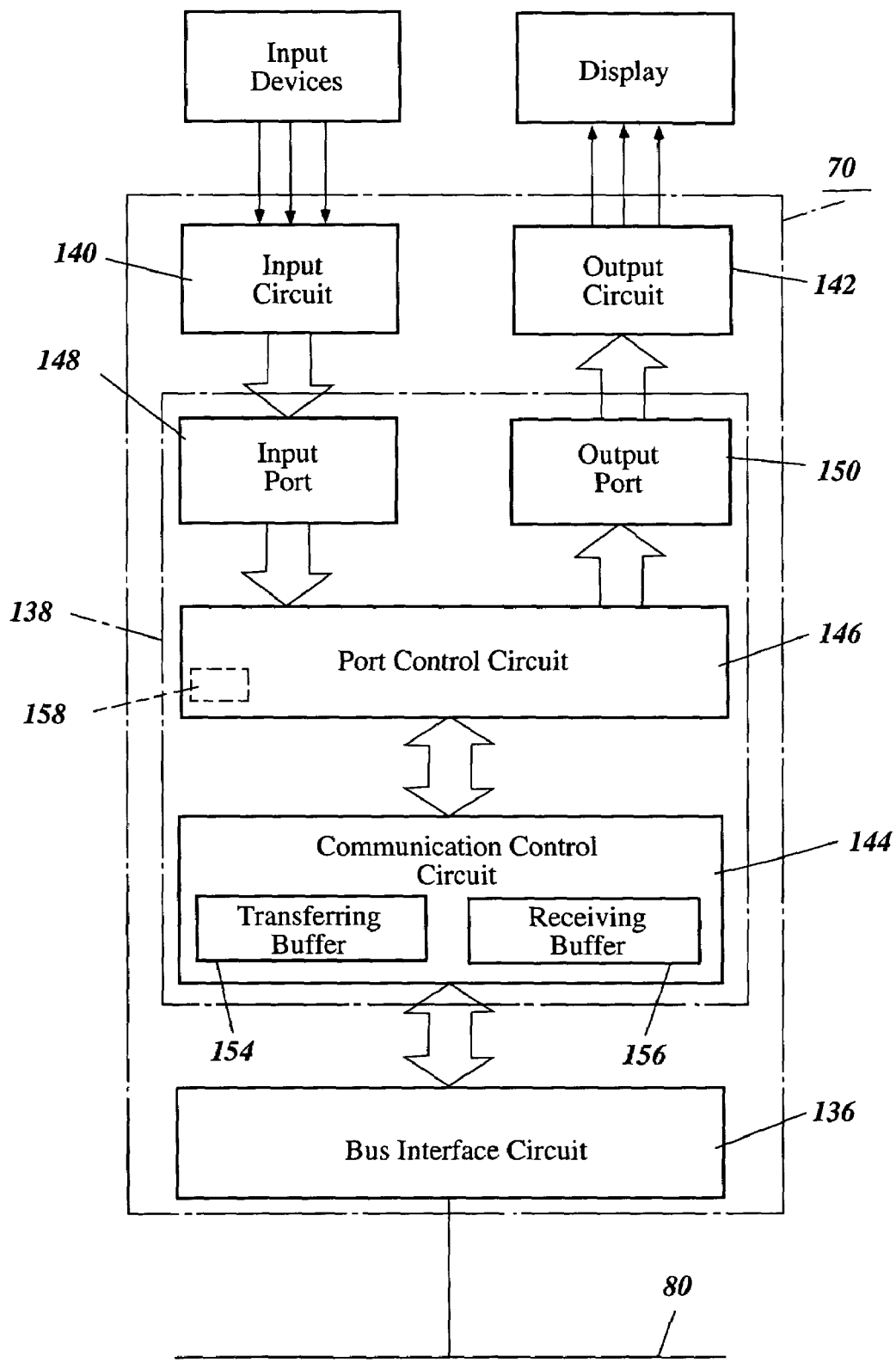
FIG. 4 illustrates a block diagram of an additional node, and specifically, a display node that is a member of the network and is provided at a display panel of the watercraft.

With reference to FIG. 4, the display node 80 comprises a bus interface circuit 136, a micro-computer 138, an input circuit 140 and an output circuit 142. The micro-computer 138 is a central processor of the display node 70 and preferably includes a communication control circuit 98, a port control circuit 146, an input port 148 and an output port 150.

The micro-computer 138 is connected to one or more devices that has data displayed on the display panel 66. In the illustrated embodiment, the devices communicate with the micro-computer 138 through the input circuit 140. Such device or devices can include a compass, for example. The input circuit 140 receives the display data from these device (s) and sends the data to the input port 140. The main switch unit under the switch key recess 68 also is connected to the input circuit 140 in this embodiment. The input port 148 receives the data from the inlet circuit 140 and passes these data over to the port control circuit 146.

The micro-computer 138 also is connected to respective indication elements of the display panel 66 through the output circuit 142. The output port 150 receives the display data from the port control circuit 146 and passes the data to the output circuit 142. The output circuit 142 then transfers the display data to the indication elements (e.g., a meter, a numeric or alphanumeric display, or a bar graph) of the display panel 66. The indication elements can includes a meter such as, for example, a residual fuel meter. In one variation, the residual fuel gauge or other type of display can be provided separately from the display panel 66 and be coupled with the display node 70.

Within the micro-computer 138, the port control circuit 146 communicates with the communication control circuit 144 that has a transferring buffer 154 and a receiving buffer 156. The communication control circuit 144 is connected to the bus 80 through the bus interface circuit 136.

The port control circuit 146 preferably incorporates at least one non-volatile storage or memory 158 such as, for example, ROM or EPROM. The non-volatile storage 158 preferably stores at least a classification identifier or ID allotted to the display node 70 and a product or parts number, manufacturing number and a manufacturer model number of the display panel 66. The identifier preferably is a serial number.

The port control circuit 146 preferably also incorporates one or more volatile storages such as, for example, RAM to store a network address or physical address that will be assigned to the display node 80 by the management node 82.

The display node 70 has a delay timer that measures an elapsed time TL after the error frame is transferred. The display node 70 also has a timer set counter that counts the number of times that the delay timer works. The port control circuit 146 preferably incorporates the delay timer and the timer set counter.

Figure 5:
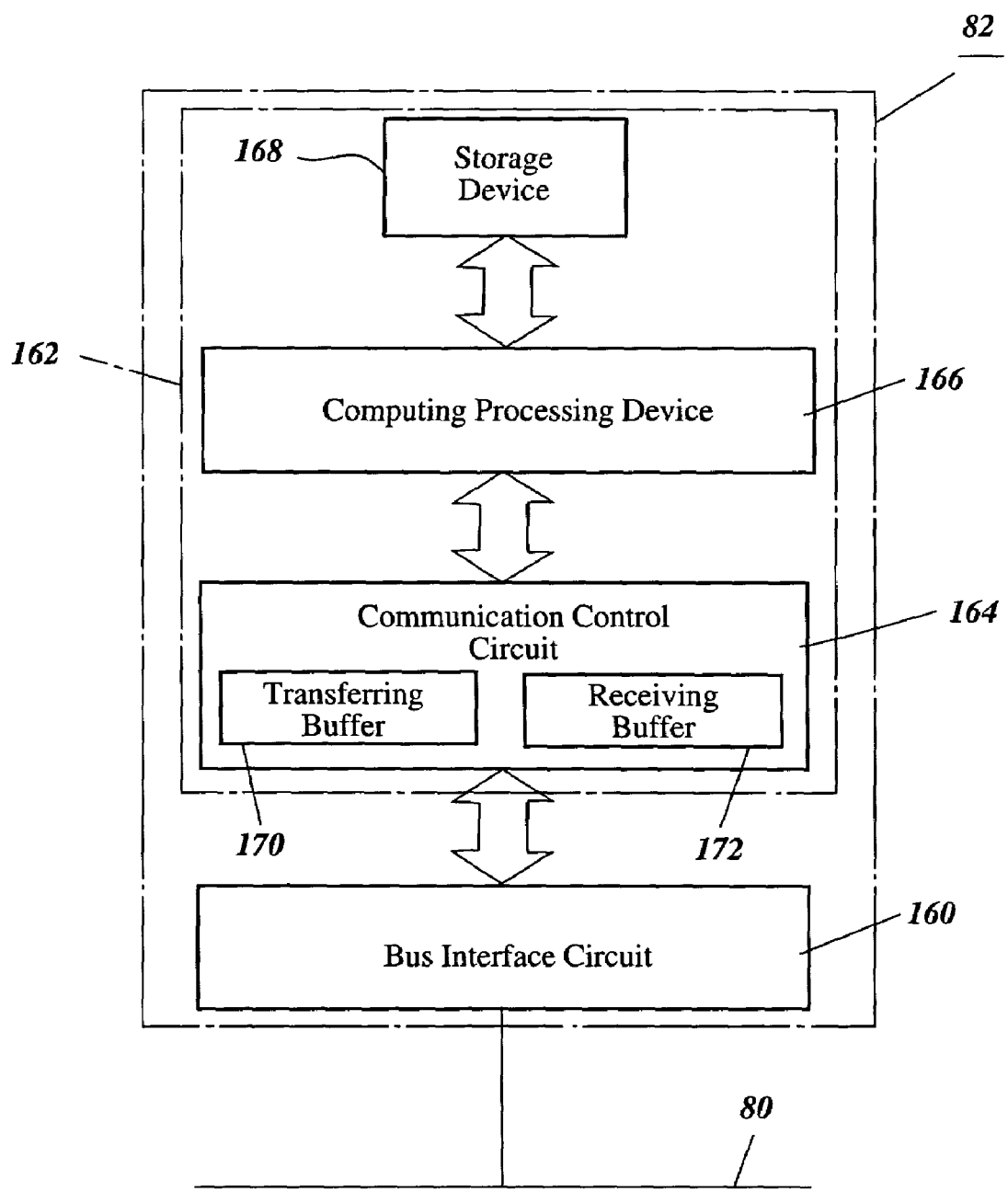
FIG. 5 illustrates a block diagram of a management node that is a member of the network and is located on the watercraft.

With reference to FIG. 5, the management node 82 comprises a bus interface circuit 160, a micro-computer 162. The micro-computer 162 preferably is a central processor of the management node 82 and includes a communication control circuit 164, a computing processing device 166 and a storage device 168.

The computing processing device 166 communicates with the communication control circuit 164 that has a transferring buffer 170 and a receiving buffer 172. The communication control circuit 118 is connected to the bus 80 through the bus interface circuit 160.

The computing processing device 166 also communicates with the storage device 168. The storage device 168 has at least one volatile storage or memory such as, for example, RAM. The storage device 168 can have non-volatile storages other than or in addition to the volatile storage. The storage device 168 preferably stores (1) a classification table indicating relationships between classifications and the classification identifiers, and (2) a physical address table (network address table) indicating the relationships among at least (a) the physical addresses (network addresses) that will be assigned to the respective terminal nodes 42A, 42B, 48, 56, 62, 70, 76, (b) the classification identifiers of the terminal node 42A, 42B, 48, 56, 62, 70, 76, and (c) the manufacturing numbers of those terminal nodes 42A, 42B, 48, 56, 62, 70, 76. In one embodiment, the physical addresses, the classification identifiers and the manufacturing numbers are listed in individual columns for those items in the address list. The physical addresses can be set at the discretion of the management node 82.

In one variation, the storage device 168 can store other numbers than the manufacturing numbers that are selected from the product or parts numbers, the manufacturer numbers or the like. In another alternative, any of such numbers are selected together or are combined to make other numbers or codes, if necessary. Further, the physical addresses, the classification identifiers, the manufacturing numbers, the product or parts numbers, the manufacturer numbers and other numbers involved in this network system may include marks, symbols and other codes than numbers.

The management node 82 has a counter (not shown) that counts the number of times that the management node 82 has transferred an individual information transfer demanding frame, which will be described with reference to the flow chart of FIG. 6. The computing processing device 166 preferably incorporates the counter.

The foregoing communication control circuit 98, 118, 144, 164 of each node watches the transferred or received data and the bus level of the bus 80, detects arbitration results that will be described below and notifies the arbitration results to the respective one of the computing processing unit 100, the port control circuit 120, 146 or the computing processing device 166.

Also, the communication control circuit 98, 118, 144, 164 of each node detects various errors and notifies the errors to the respective one of the computing processing unit 100, the port control circuit 120, 146 or the computing processing device 166.

The errors include, for example, a bit error, a data error and/or a CRC error. The bit error is detected when the output level of each node and the level on the bus 80 are compared with each other and bits in each node output except for a stuffed bit or stuffed bits have different level with the bits on the bus 80. In the illustrated embodiment, a data error is detected when the same level is continuously detected (e.g., six bits or more) even a stuffed bit or stuffed bits are involved in a certain field. That is, normally, a reversed bit is added into a field to inhibit a burst error from occurring if some bits that has the same level abnormally continues (e.g., five bits). If the next bit also has the same level despite of this addition of the reversed bit, then a data error has occurred.

Figure 6:
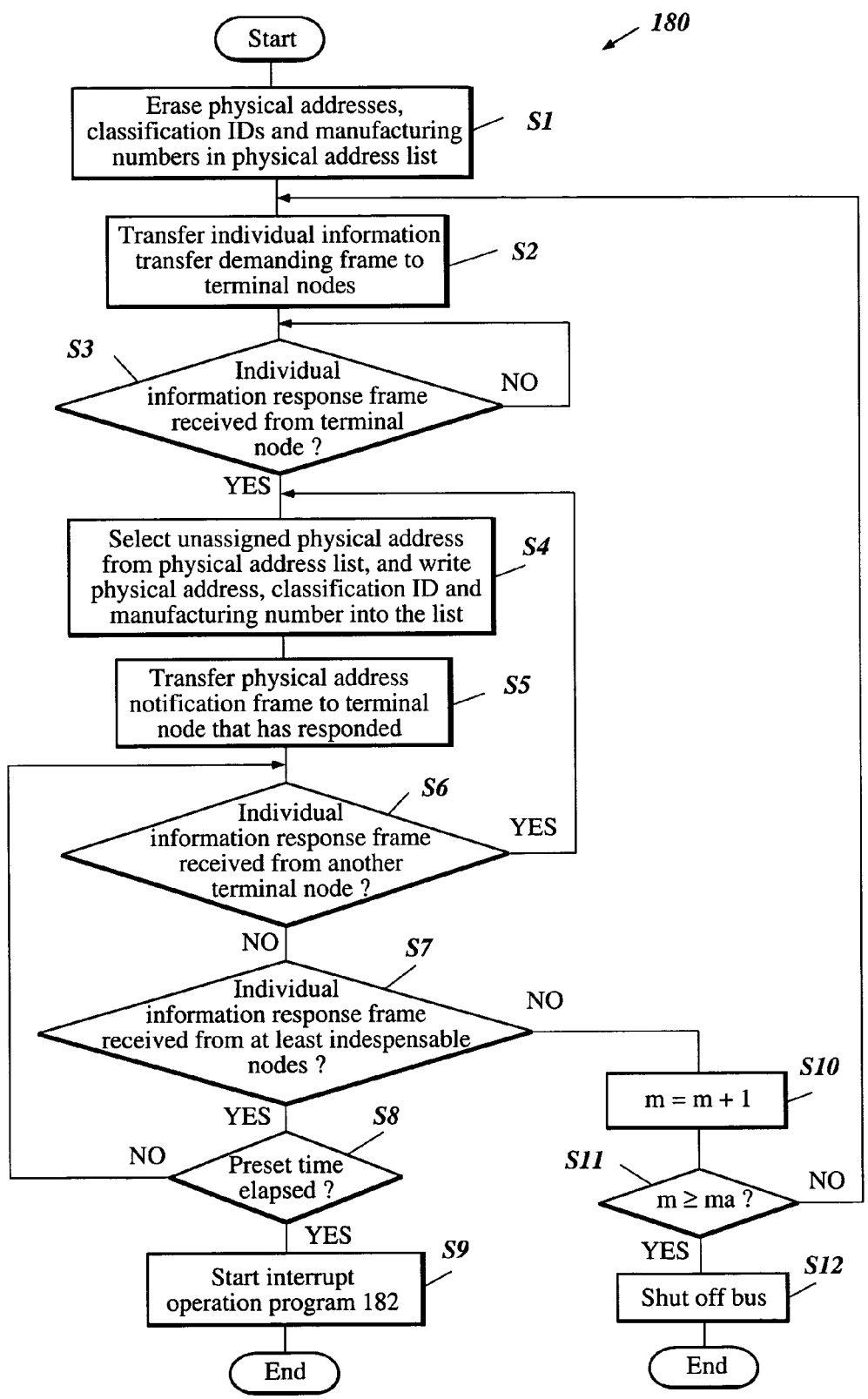
FIG. 6 illustrates a flow chart of an embodiment of an initial operation for providing network addresses to the terminal nodes that is conducted by the management node.
Figure 7:
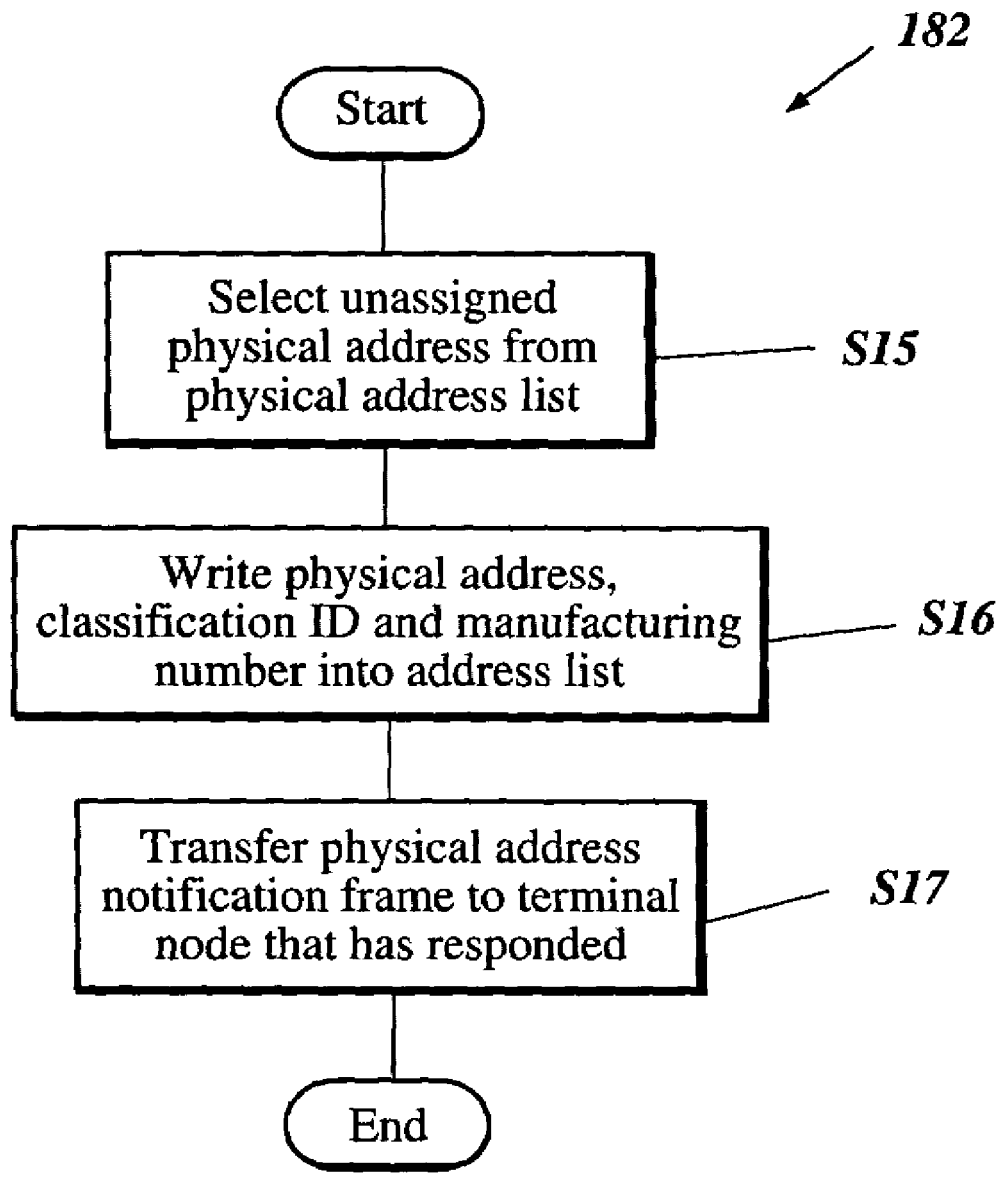
FIG. 7 illustrates a flow chart of an embodiment of an interrupt operation for providing network addresses to the terminal nodes that also is conducted at the management node.

The management node 82 provides the physical addresses (network addresses) to the terminal nodes 42A, 42B, 48, 56, 62, 70, 76, preferably while performing either an initial operation program 180 (shown in FIG. 6) or an interrupt operation program 182 (illustrated in FIG. 7).

With initial reference to FIG. 6, the initial operation program 180 preferably starts when the main switch unit is turned on. The main switch unit in this embodiment is turned on when the operator rotates the switch key in the switch key recess 68. In this embodiment, all the terminal nodes 42A, 42B, 48, 56, 62, 70 except for the fish-finder node 76 are turned on when the main switch unit is turned on. The management node 82 waits for the terminal nodes 42A, 42B, 48, 56, 62, 70 to become ready to start before proceeding to run the program.

The management node 82, at Step S1, preferably erases all erasable storages in the storage device 168. That is, the management node 82 erases all the physical addresses, the classification identifiers and the manufacturing numbers previously recorded in the physical address table (network address table). The program 180 then proceeds to Step S2.

At Step S2, the management node 82 creates an individual information transfer demanding frame that demands each terminal node 42A, 42B, 48, 56, 62, 70 to transfer at least its respective classification identifier and the manufacturing number (or similar identification information) to the management node 82. The management node 82 provides the individual information transfer demanding frame to the bus 80. Then, the program 82 proceeds to Step S3.

The management node 82, at Step S3, determines whether at least one individual information response frame has been received from one of the terminal nodes 42A, 42B, 48, 56, 62, 70. The fish-finder node 76 will not transfer this frame if the fish-finder 74 has not yet been turned on. The terminal nodes 42A, 42B, 48, 56, 62, 70, except for the fish-finder node 76, transfer the respective individual information response frame to the management node 82. If the determination at Step S3 is negative, i.e., no individual information response frame has been received, the management node 82 repeats Step S3 until an individual information response frame is received. If the determination is positive, the program 180 proceeds to Step S4.

At Step S4, the management node 82 preferably refers to the physical address table stored in the storage device 168 and selects one physical address which has the smallest number in physical addresses that has not yet been allotted to any terminal nodes. At the very beginning, no physical address has been allotted, so the management node 82 can select the smallest number in the entire list and assign the number to the first responding node 42A, 42B, 48, 56, 62, 70 as the physical address for that node. The management node 82 writes or registers the selected physical address in a column of the physical address table, and also writes or registers the classification identifier and the manufacturing number in other columns of the physical address table corresponding to the column in which the physical address has been written. Of course, the management node 82 can write to other cells in the table provided that the cells in which the information is stored correspond with one another (e.g., information written to cells in adjacent rows). The program 180 then proceeds to Step S5.

The management node 82, at Step S5, creates a physical address notification frame that includes the physical address table having the assigned physical address(es), the classification identifier(s) and the manufacturing number(s) and transfers the physical address notification frame to the first responding node 42A, 42B, 48, 56, 62, 70. The program 180 proceeds to Step S6.

At Step S6, the management node 82 determines whether another individual information response frame has been received from another terminal node 42A, 42B, 48, 56, 62, 70. If the determination is positive, the program 180 returns to and repeats Step S4 for the next-to-respond terminal node. Step 4 is repeated for each responding terminal node, which usually includes all of the terminal node except for the fish-finder node. If the determination is negative, the program 180 proceeds to Step S7.

At Step S7, the management node 82 determines whether the individual information response frames have been received from indispensable nodes which cannot be neglected in the control of the outboard motors 36A, 36B. In the illustrated embodiment, the indispensable nodes include at least the drive nodes 42A, 42B, the remote controller node 56 and the steering node 62. If the determination at Step S6 is positive, i.e., all the individual information response frames have been received from the indispensable nodes 42A, 42B, 56, 62, the program proceeds to Step S8.

The management node 82, at Step S8, determines whether a preset time has elapsed. The preset time preferably includes sufficient time in which the management node 82 can complete at least the procedure to allot the physical addresses to the indispensable nodes 42A, 42B, 56, 62 and also to write the physical address table. If the determination at Step S8 is positive, the program 180 proceeds to Step S9. The management node 82, at Step S9, starts the interrupt operation program 182 shown in FIG. 7 and then the initial operation program 180 ends. If the determination at Step S8 is negative, the program 180 returns to Step S6 to repeat Step S6.

If the determination at Step S7 is negative, the program 180 proceeds to Step S10. The management node 82, at Step S10, sets a count number m of the counter by incrementing by "1" or adding "1" to the previous count number m. The program 180 proceeds to Step S11.

At Step S11, the management node 82 determines whether the count number m is equal to or greater than an abnormal count number ma, which is stored I memory. If the determination at Step S11 is positive, the program 180 goes to Step S12 and the management node 82 shuts down at least a portion of the bus 80. The program 180 then ends.

The management node 82 preferably informs the abnormal condition to the display node 70 to indicate this condition on the display panel 66. In one variation, the management node 82 can directly sends a signal indicative of the abnormal condition to an warning indication element in the display panel 66, which can be a liquid crystal indicator, for example, to indicate the condition at this element, even if the display node 70 has not been assigned with a physical address at this moment. A warning buzzer can additionally or alternatively sounds to inform the abnormal condition to the operator.

If the determination at Step S12 is negative, i.e., the count number m is less than the abnormal count number ma, the program 180 returns to Step S2 to repeat Step S2. At least the indispensable nodes 42A, 42B, 56, 62 thus will be assigned individual physical addresses before the network can be used by the associated devices. The terminal nodes that have been assigned with the physical addresses are activated and can communicate with all the other active nodes on the CAN 32.

With reference to FIG. 7, the interrupt operation program 182 starts when the management node 82 receives another individual information response frame from one of the remainder nodes. The interrupt operation program 182 preferably interrupts any other program being run by the management node 82. In the illustrated embodiment, the reminder nodes can include the velocity sensor node 48 and the display node 66, if those nodes 48, 66 have not been assigned with a the physical address by the time the initial operation program 180 ends. The fish-finder node 76 can be included in the remainder nodes, for example, if the fish-finder 74 is turned on after the initial operation program 180 ends.

The program 182 proceeds to Step S15 once started. At Step S15, the management node 82 in the illustrated embodiment refers to the physical address table stored in the storage device 168 and selects the smallest number, which has not yet been allotted to any terminal nodes, as a physical address that will be assigned to the terminal node that has transferred the individual information response frame. Of course, other protocols for assigning physical addresses can also be used. The program 182 then goes to Step S16.

The management node 82, at Step S16, writes the selected physical address in a column of the physical address table, and also writes the classification identifier and the manufacturing number in other columns of the physical address table corresponding to the column in which the physical address has been written. The program 182 then goes to Step S17.

The management node 82, at Step S17, creates a physical address notification frame that includes the physical address table having the physical address, the classification identifier and the manufacturing number and transfers the physical address notification frame to the terminal node that needs the physical address. The management node 82 also sends the frame to the other terminal nodes so as to update their physical address tables. The program 182 then ends.

Figure 8:
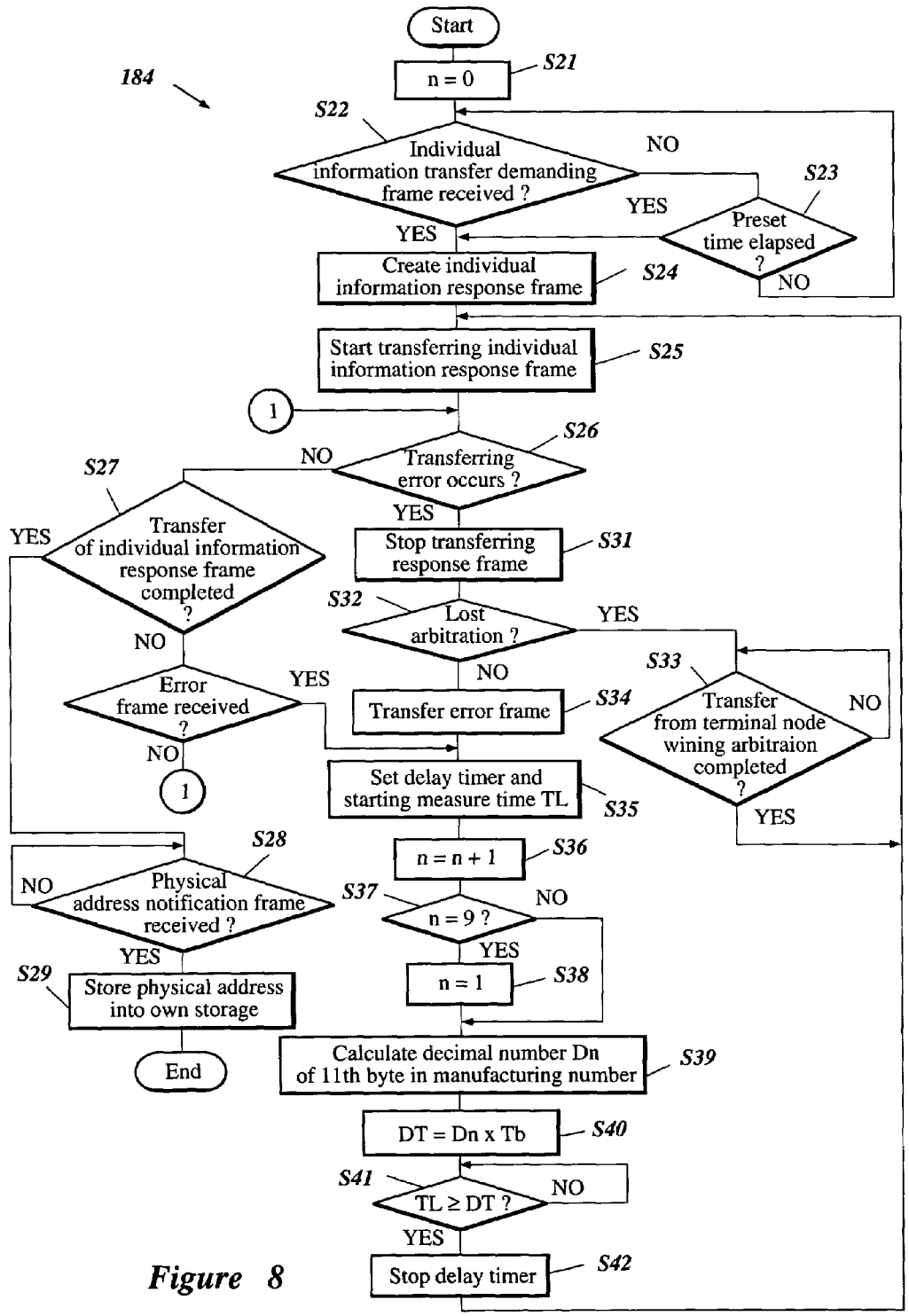
FIG. 8 illustrates a flow chart of an embodiment of an operation for obtaining network addresses from the management node that is conducted at the terminal nodes.

An individual operation program 184 shown in FIG. 8 preferably is used for conducting an operation on the side of each terminal node 42A, 42B, 48, 56, 62, 70, 76. In order to simplify the description, the operation program 184 is described in the context of its operation in the drive node 42A, for example, unless specific descriptions are necessary about the operation program 184 and performed by another node. The operations on the other terminal nodes 42B, 48, 56, 62, 70, 76 are generally the same as the operation on the terminal node 42A and will be easily understood by those of skill in the art in view of the following description.

With reference to FIG. 8, the drive node 42A starts and proceeds to Step S21 when the main switch unit is turned on. The drive node 42A resets the count number n in the timer set counter to "0" at Step S21. The program 184 then goes to Step S22.

The drive node 42A determines whether the individual information transfer demanding frame is received from the management node 82 at Step S22.

If the determination at Step S22 is positive, the program 184 directly goes to Step S24. If the determination at Step S-22 is negative, i.e., the individual information transfer demanding frame is not received from the management node 82, the program 184 goes to Step S23.

Normally, the determination at Step S22 in connection with the drive nodes 42A, 42B, the velocity sensor node 48, the remote controller node 56, the steering node 62 and the display node 70, which are turned on generally simultaneously when the main switch unit is turned on, is positive, because the management node 82 has transferred the individual information transfer demanding frame at this moment. However, the determination at Step S22 in connection with the fish-finder 76 can be negative because the fish-finder 74 typically is turned on when the watercraft 30 reaches a fishing site. Thus, in this embodiment, Step S23 is mainly for the fish-finder node 76.

The drive node 42A, at Step S23, determines whether a preset time has elapsed. If the determination at Step S23 is negative, the program 184 returns back to Step S22 to repeat Step S22. If the determination at Step S23 is positive, the program 184 goes to Step S24 to conduct Step S24.

Figure 9:
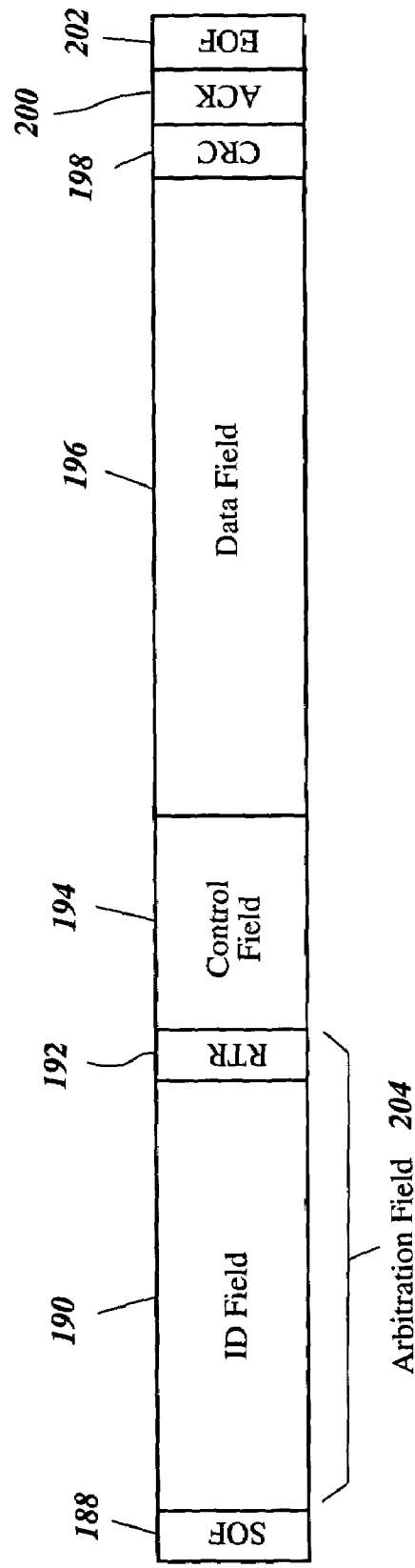
FIG. 9 illustrates an example of an individual information response frame that each terminal node can create and transfer to the management node.

At Step S24, the drive node 42A creates the individual information response frame that includes its own classification identifier and manufacturing number. FIG. 9 illustrates an example form of the individual information response frame. The frame preferably includes a SOF (start of frame) field 188, an ID field 190, an RTR (remotely transferring requirement) field 192, a control field 194, a data field 196, a CRC field 198, an ACK field 200 and an EOF (end of frame).

The ID field 190 and the RTR field 192 together form an arbitration field 204. The SOF field 188 and the RTR field 192 each preferably comprise a single bit. The CRC field 98, the ACK field 200 and the EOF field 202 preferably each comprises at least one bit. The ID field 190 preferably comprises eleven bits or 29 bits. The control field 194 preferably comprises six bits. The data field 196 preferably comprises 64 bits.

The ID field 190 includes the classification identifier, while the data field 196 includes the manufacturing number of the outboard motor 36A. Both the ID fields 190 of the drive nodes 42A, 42B have the same classification identifier. The classification identifier for the drive nodes 42A, 42B preferably involves a larger number of dominants than the classification identifier for other nodes 48, 56, 62, 70, 76. In other words, the classification identifier for other nodes 48, 56, 62, 70, 76 preferably involve a larger number of recessives than the classification identifier for the drive nodes 42A, 42B. The manufacturing number preferably is expressed in hexadecimal notation.

The SOF field 188 is indicative of the beginning of the frame. The RTR field 192 is provided to demand or require other nodes to transfer data thereof. The CRC field 198 is provided to detect transfer errors. The EOF field 202 is indicative of the end of the frame. The drive node 42A provides the classification identifier stored in the non-volatile storage 109 to the ID filed 190. The drive node 42A also provides the manufacturing number stored in the non-volatile storage 109 to the data field 196.

The program 184 then proceeds to Step S25. The drive node 42A, at Step S25, provides the individual information response frame created at Step S24 to the bus 80, i.e., starts transferring the individual information response frame to the management node 82 via the bus. Then, the program 184 proceeds to Step S26.

At Step S26, the drive node 42A determines whether any transferring error occurred. Transferring errors can occur when bit error, data error and/or CRC error, which were described above, happen. In addition, the transferring errors can occur when a contention between two or more nodes occurs and one of the nodes loses an arbitration therebetween, i.e., when the drive node 42A and another terminal node(s) simultaneously transfer the respective individual information response frames to the management node 82 and the drive node 42A loses the arbitration. Normally, the contention is arbitrated with a manner that will be described below. If the determination at Step S26 is negative, i.e., a transferring error has not occurred, the program 184 proceeds to Step S27.

The drive node 42A, at Step S27, determines whether the transfer of the individual information response frame has been completed. If the determination at Step S27 is positive, the program goes to Step S28. The drive node 42A determines whether the physical address notification frame from the management node 82 has been received. If the determination at Step S28 is negative, i.e., the transfer of the individual information response frame is not complete, the drive node 42A repeats Step S28 until the determination becomes positive.

The program 184 proceeds to Step S29 when the determination at Step S28 becomes positive. At Step S29, the drive node 42A picks up the physical address (i.e., network address) from the physical address notification frame that has been received from the management node 82 and stores the physical address in its own storage such as, for example, the RAM in the computing processing unit 100. The program 184 then ends.

If the determination at Step S27 is negative, i.e., the transfer of the individual information response frame has not completed, the program 184 goes to Step 30. The drive node 42A determines whether an error frame has been received from another node 42B, 48, 56, 62, 70 at Step 30. The error frame preferably comprises an active error flag having six dominant bits (e.g., logical level "0") and an error delimiter having eight recessive bits (e.g., logical level "1"). If the determination at Step 30 is negative, the program 184 returns back to Step S26 assuming that the transfer of the individual information response frame still continues. If the determination at Step 30 is positive, the program 184 proceeds to Step 35, which will be described shortly, assuming that a transfer error has occurred.

If the determination at Step S26 is positive, i.e., some transferring error occurs, the program 184 goes to Step S31 and the drive node 42A stops transferring the individual information response frame. The program 184 then proceeds to Step 32.

At Step S32, the drive node 42A determines whether the transferring error has arisen from losing an arbitration with another node 42B, 48, 56, 62, 70. In the illustrated embodiment, the arbitration is conducted by comparing the arbitration field 204 (FIG. 9) with that of the other node 42B, 48, 56, 62, 70. The comparison is made bit by bit in the arbitration filed 204. If the drive node 42A submits a recessive bit and the other node 42B, 48, 56, 62, 70 submits a dominant bit, then the drive node 42A loses in the arbitration. If the drive node 42A and the other node 42B, 48, 56, 62, 70 both submit the same dominant or recessive bit, the comparison is made using each next bit.

If the determination at Step S32 is positive, i.e., the drive node 42A has lost the arbitration, the program 184 goes to Step S33. The drive node 42A determines, at Step S33, whether the other node 42B, 48, 56, 62, 70, which won the arbitration, has completed the transfer of its individual information response frame. If the determination at Step S33 is negative, the program 184 repeats Step S33 until the transfer of the individual information response frame by the other node 42B, 48, 56, 62, 70 is completed. If the determination at Step S33 is positive, the program 184 returns to and repeats step S25.

If the determination at Step S32 is negative, i.e., the drive node 42A neither lost nor won an arbitration, the program 184 goes to Step S34 assuming that the bit error, data error or CRC error has occurred. At Step S34, the drive node 42A creates an error frame and transfers the error frame to the other nodes 42B, 48, 56, 62, 70 through the bus 80. The program 184 then goes to Step S35.

At Step S35, the drive node 42A starts the delay timer to measure an elapsed time TL after the drive node 42A has transferred the error frame. Then, the program 184 goes to Step S36.

The drive node 42A sets the count number n of the timer set counter by incrementing it by "1" or adding "1" to the previous count number n. The program 184 then goes to Step S37.

The drive node 42A, at Step S37, determines whether the counter number n equal to "9," i.e., whether the timer set counter has set the timer nine times. If the determination at Step S37 is positive, the program 184 goes to Step S38 and the drive node 42A sets the count number n to "1" at Step S38. The program 184 then goes to Step S39. If the determination at Step S37 is negative, i.e., the timer set counter has not yet set the timer nine times, the program 184 directly moves to Step S39.

At Step S39, the drive node 42A divides the manufacturing number (e.g., serial number) in the data field 196 (FIG. 9), which is expressed in the hexadecimal notation in this embodiment, into a plurality of bytes from the head, chooses the byte at the order n from the head, which corresponds to the counter number n, and calculates a decimal number Dn (in base 10) using the byte at the order n. The byte comprises eight bits. Because the counter number n is "1" at this moment, the drive node 42A chooses the first byte. For example, if the first byte is "12," then the number "18" ($=1*16^1+2$) is calculated out as the decimal number Dn. The program 184 then goes to Step S40.

The drive node 42A further calculates a delay time DT using the following formula:

$$Dt=Dn*Th$$

That is, the delay time Dt is calculated by multiplying the decimal number Dn by a transfer time Tb of one bit, which is a clock time of the CAN 32. For example, the transfer time Tb is 4 ìs (micro seconds) if the communication speed of the network is 250 Kbps (kilo bits per second). Also, for example, if the decimal number Dn is "18" and the transfer time Tb is 4 ìs, the delay time Dt is 72 ìs ($=18*4$). The program 184 goes to Step S41 after calculating the delay time Dt.

At Step S41, the drive node 42A determines whether the elapsed time TL, which was started at Step 35 is equal to or greater than the delay time DT. If the determination at Step S41 is negative, the program 184 repeats Step S41 until the delay time DT has elapsed. If the determination at Step S41 is positive, i.e., the delay time Dt has elapsed, the program 184 goes to Step S42 and the drive node 42A stops the delay timer. The program 184 then returns to Step S25 and repeats Step S25, i.e., starts transferring the individual information response frame.

With reference to FIGS. 6-8, the interrelated operations of the management node 82 and the terminal nodes 42A, 42B, 48, 56, 62, 70, 76 in the illustrated embodiment are described below.

Before the main switch unit is turned on, all the terminal nodes 42A, 42B, 48, 56, 62, 70, 76 and the management node 82 are not supplied with electric power. As noted above, all the nodes 42A, 42B, 48, 56, 62, 70, 82 except for the fish-finder node 76 are supplied with the electric power when the main switch unit is turned on in the illustrated embodiment. An initial assignment procedure of physical addresses is now ready to start.

The management node 82 erases all the physical addresses, the classification identifiers and the manufacturing numbers in the physical address list after the terminal nodes 42A, 42B, 48, 56, 62, 70 are ready to communicate with the management node 82 (Step S1). The management node 82 then creates the individual information transfer demanding frame and provides the frame to the bus 80 (Step S2).

Generally at the same time, the respective terminal nodes 42A, 42B, 48, 56, 62, 70 reset the count number n in each timer set counter to "0" (Step S21). Next, the terminal nodes 42A, 42B, 48, 56, 62, 70 create the individual information response frame (Step S24) when the terminal nodes 42A, 42B, 48, 56, 62, 70 has received the individual information transfer demanding frame from the management node 82 (Step S22). More specifically, the terminal nodes 42A, 42B, 48, 56, 62, 70 read the classification identifier stored in each non-volatile storage and write the classification identifier in the ID field 190 of the individual information response frame shown in FIG. 9. The terminal nodes 42A, 42B, 48, 56, 62, 70 also read the manufacturing number stored in the non-volatile storage and write the manufacturing number in the data field 196 of the individual information response frame. The terminal nodes 42A, 42B, 48, 56, 62, 70 then start transferring the individual information response frames to the management node 82 through the bus 80 (Step S25).

Because all the terminal nodes 42A, 42B, 48, 56, 62, 70 generally simultaneously start transferring the individual information response frames, some of the individual information response frames may be simultaneously placed on the bus 80. That is, a contention may occur between two or more terminal nodes 42A, 42B, 48, 86, 62, 70. As described above, the drive nodes 42A, 42B have a larger number of dominant bits than the other nodes 48, 56, 62, 70. Thus, the drive nodes 42A, 42B have a better chance to win in the arbitration than the other nodes 48, 56, 62, 70 when the arbitration fields 204, which each include the respective ID field 190, appear on the bus 80. Accordingly, either of the drive nodes 42A, 42B can complete the transfer of its own-individual information response frame to the management node 82 with higher probability (Step S27) than the other nodes.

The management node 82 receives the individual information response frame (Step S3). The management node 82 reads the classification identifier from the ID field 190 in the frame and the manufacturing number in the data field 196 in the frame. Then, the management node 82 selects a physical address, which has not yet been allotted to any nodes, in the physical address list and write the classification identifier and the manufacturing number in the columns of the physical address list that correspond to the selected physical address (Step S4). Preferably, the management node 82 chooses a physical address that has a number of dominant bits from the head when the management node 82 provides the physical address to either the first drive node 42A or the second drive node 42B.

Then, the management node 82 creates the physical address notification frame including the selected physical address and transfers the physical address notification frame to the node that transferred the individual information response frame (Step S5).

The node that has won the arbitration receives the physical address notification frame (Step S28). The node reads the physical address in the notification frame and stores the physical address in the volatile storage, e.g., RAM (Step S29). The physical address obtaining procedure at this particular node ends, accordingly.

Afterwards, the node that has obtained the physical address can create a transfer frame that has the ID field 190 and the data field 196 whenever transferring data. If the ID field 190 comprises eleven bits, for example, the ID filed 190 preferably includes the obtained physical address as its own network address and a data classification that indicates a classification of data that will be transferred. The data field 196 includes data that needs to be transferred. The node can place the transfer frame onto the bus 80 to communicate with other nodes. Because the ID field 190 does not include the physical address of a particular node, it is uncertain if the particular node can receive the transfer frame. In order to improve the uncertainties, if the ID field 190 comprises 29 bits, for example, the ID filed 190 can additionally includes the physical address of the particular node. Thus, the node can surely transfer the frame to the particular node.

In the meantime, the node that has lost the arbitration must wait for the completion of the transfer of the individual information response frame by the node that has won the arbitration (Step S33). The losing node may have a "re-challenge right" for transferring its own individual information response frame to the management node 82 (Step S25) after the completion of the transfer of the individual information response frame by the winning node.

The node that has a number of dominant bits from the head of the arbitration field 204 in the individual information response frame has more chances to win the arbitration than other nodes that do not have the same number of dominant bits at the heads of their arbitration fields 204 whenever two or more nodes simultaneously transfer the individual information response frames. Both the drive nodes 42A, 42B have a first or the highest priority in this embodiment. Preferably, either the remote controller node 56 or the steering node 62 has a second highest priority and at least has a higher priority than the velocity sensor node 48, the display node 70 and the fish-finder node 76.

Both the drive nodes 42A, 42B can simultaneously transfer the individual information response frames to the management node 82. The arbitration between the drive nodes 42A, 42B cannot be effective because the respective arbitration fields 204 are identical to each other. Both the drive nodes 42A, 42B thus simultaneously start transferring the bits of the following control fields 194. The respective control fields 194 of the drive nodes 42A, 42B also are coincident with one another. The drive nodes 42A, 42B still continue to transfer the frames.

The transfer reaches the data fields 196. As described above, each data field 196 has a different manufacturing number (e.g., serial number) because the outboard motors 36A, 36b have different manufacturing numbers than each other. If the drive node 42A transfers a recessive bit and the drive node 42B transfers a dominant bit, the bus 80 becomes the dominant level. The drive nodes 42A, 42B receive the data that have been transferred by them for confirmation. The drive node 42A that has transferred the recessive bit determines that a transferring error, which is a bit error at this moment, has occurred (Step S26) because the bus level is different from the bit level that the drive node 42A has transferred. The drive node 42A thus stops transferring the remainder of the individual information response frame (Step S31).

The drive node 42A determines that the transferring error was not caused by any arbitration loss (Step S32). Then, the drive node 42A creates the error frame and transfers the error frame to the drive node 42B through the bus 80 (Step S34). The drive node 42A starts conducting a delay time setting procedure (Steps S35-S42).

In the meantime, the drive node 42B, which has transferred the dominant bit receives the error frame (Step S30) that was transferred from the drive node 42A and also starts conducting the delay time setting procedure of its own (Steps S35-S42).

For instance, the delay time setting procedure is described below assuming that the manufacturing number stored in the drive node 42A is "01 23 45 67 89 AB CD EF" in the hexadecimal notation and the manufacturing number stored in the drive node 42B is "01 23 55 46 89 AB CD EF" in the hexadecimal notation.

The delay timer of each drive node 42A, 42B is set to start measuring the time TL (Step S35). The timer set counter of each drive node 42A, 42B now have "1" as the count number n (Step S36) because the count number n was reset to "0" at Step S21. Thus, the decimal number Dn is calculated at the first drive node 42A by the hexadecimal number "01," which is the first byte of the data field of the first drive node 42A, and also the decimal number Dn is calculated at the second drive node 42B by the hexadecimal number "01," which also is the first byte of the data field of the second drive node 42B (Step S39). Both decimal numbers Dn are the same and is "1" because the hexadecimal numbers compared with each other at this moment are the same.

Each drive node 42A, 42B calculates the delay time DT based upon the decimal number Dn, which is "1" (Step S40). If the transfer time of one bit is 4 is, the delay time DT is 4 is (=1*4 is). The delay timer of each drive node 42A, 42B simultaneously stops 4 is later (Step S42). The transferring priority order thus has not been decided by the first attempt. The program 184 returns back to Step S25 and the first drive node 42A again transfers the individual information response frame. Steps S26, S31, S32 are repeated at the first drive node 42A. The first drive node 42A then transfers the error frame again to the second drive node 42B at the next Step S34. The delay time setting procedure thus is re-conducted at both the drive nodes 42A, 42B.

The timer set counter of each drive node 42A, 42B now have "2" as the count number n (Step S36). The decimal number Dn is calculated by the hexadecimal number "23" at the first drive node 42A and also the decimal number Dn is calculated by the hexadecimal number "23" at the second drive node 42B (Step S39). Both decimal numbers Dn are the same again and equal "35."

Each drive node 42A, 42B calculates the delay time DT based upon the decimal number Dn, which is "35" (Step S40). The delay time DT at this moment is 140 is (=35*4 is). The delay timer of each drive node 42A, 42B thus stops 140 is later (Step S42). The drive nodes 42A, 42B simultaneously starts transferring the individual information response frame again because the delay time DT is the same also in this attempt. The delay time setting procedure thus is repeatedly conducted again at both the drive nodes 42A, 42B.

The timer set counter of each drive node 42A, 42B now have "3" as the count number n (Step S36). The decimal number Dn is calculated by the hexadecimal number "45" at the first drive node 42A and also the decimal number Dn is calculated by the hexadecimal number "55" at the second drive node 42B (Step S39). Decimal numbers Dn now are different. That is, the decimal number Dn at the first drive node 42A is "69" ($4*16^1+5$) while the decimal number Dn at the drive node 42B is "85" ($5*16^1+5$).

The drive node 42A calculates the delay time DT based upon the decimal number Dn "69" (Step S40) and the delay time DT at the first drive node 42A as 276 is (=69*4 is). Meanwhile, the drive node 42B calculates the delay time DT based upon the decimal number Dn "85" (Step S40) and the delay time DT at the drive node 42B as 340 is (=85*4 is). The delay timer of the first drive node 42A, 42B stops 276 is later, while the delay timer of the second drive node 42B stops 340 is later (Step S42). Accordingly, the individual information response frame of the first drive node 42A reaches the management node 82 before the individual information response frame of the second drive node 42B. The first drive node 42A thus wins the transferring priority decision race against the second drive node 42B and obtains a physical address (network address).

Now that the first drive node 42A has obtained the physical address, only the second drive node 42B continues to repeatedly transfer the individual information response frame to the management node 82. The second drive node 42B thus should be able to obtain its physical address through its next attempt.

In the illustrated embodiment, the delay time is advantageously set using each manufacturing number (e.g., serial number) that is specific to each device even though devices, such as, for example, the drive nodes 42A, 42B, have the same classification identifier. The network, such as the CAN 32, can boot up quickly because the network address assignment procedure can be completed within a short period.

In addition, the manufacturing number, which originally is a hexadecimal number, is divided into a plurality of bytes, and the delay time DT is calculated by multiplying one of the divided bytes, which is changed to decimal number Dn, by a transfer time of one bit Tb in this embodiment. Because the byte has eight bits, the decimal number Dn is limited within a range between 0-255. If the transfer time of one bit is 4 is, the delay time DT is less than 1,020 is (=255*4 is). In other words, the delay time DT will not exceed this period in this embodiment.

The manufacturing number can be divided in various ways. For example, the manufacturing number can be divided into bit units, which comprises a plurality of bits, other than the byte. Also, the divided bit units can be selected in various ways. For example, the bit units can be selected from the tail in sequence. The divided bit units can be selected at intervals, skipping here and there in a predefined manner, or one from the head next from the tail. Further, the bit units can be selected without order or at random.

Other numbers than the manufacturing number can be used for calculating the delay time DT. For example, the parts number, product number, manufacturer number or any other numbers related to the associated device or component can be used. In addition, any codes other than numbers can be applied inasmuch as the codes can be converted to numbers by a decoder or a converter.

Using the numbers or codes that has already assigned to the devices, or one or more components thereof, is advantageous because no procedure is necessary to provide other numbers or codes to determine priority or to stagger the transfer of the frames. However, new numbers or codes still can be used to calculate the delay time DT.

As thus described, all the terminal nodes 42A, 42B, 48, 56, 62, 70 except for the fish-finder node 74, usually obtain the respective physical addresses in the initial assignment procedure of physical addresses. Communication among those terminal nodes 42A, 42B, 48, 56, 62, 70 is available once the network addresses have been assigned. Thus all the devices 36A, 36B, 38A, 38B, 46, 54, 62, 68 related to the terminal nodes 42A, 42B, 48, 56, 62, 70 are activated. For instance, the operator can start the engines 38A, 38B and control the throttle valves of the engines 38A, 38B and the changeover mechanisms of the outboard motors 36A, 36B by operating the remote controller 54. The operator also can steer the outboard motors 36A, 36B by operating the steering device 60.

The initial assignment procedure ends without assigning any physical address to the fish-finder node 76. The fish-finder node 76 can obtain a physical address in an interrupt assignment procedure described below.

The operator turns on a power switch of the fish-finder 74 when, for example, the watercraft 30 reaches a fishing site. The fish-finder node 76 thus is supplied with the electric power and the individual operation program 184 (FIG. 8) at the fish-finder node 76 starts.

In this particular operation, the management node 82 has already finished the initial assignment procedure that is conducted using the initial operation program 180 (FIG. 6). Thus, the individual information transfer demanding frame will not be transferred to the fish-finder node 76 (Step S22). The fish-finder node 76 waits for a preset time to elapse (Step S23). After the preset time has elapsed, the fish-finder node 76 creates the individual information response frame and transfers the frame to the management node 82 (Step S24) through the bus 80.

Upon receiving the individual information response frame from the fish-finder node 76, the management node 82 starts the interrupt operation program 182 (FIG. 7).

First, the management node 82 refers to the physical address list stored in the storage device 168 in ascending order and selects one physical address that has not been allotted to any terminal nodes (Step S15). Next, the management node 82 writes the selected physical address in a column of the physical address table, and also writes the classification identifier and the manufacturing number in other columns of the physical address table corresponding to the column in which the physical address has been written (Step S16). The management node 82 then creates a physical address notification frame that includes the physical address table having the physical address, the classification identifier and the manufacturing number and transfers the physical address notification frame to the fish-finder node 76 (Step S17). This frame is also received by the other terminal nodes.

The fish-finder node 76 receives the physical address notification frame (Step S28). The fish-finder node 76 reads the physical address in the notification frame and stores the physical address in the volatile storage, e.g., RAM (Step S29). The other terminal nodes do likewise in order to store the physical address of the fish finder node 76 for possible future communication.

Afterwards, the fish-finder node 76 can communicate with other terminal nodes, particularly, the display node 70. Fish finding data obtained by the fish-finder 74 thus can be displayed on the display panel 66 whenever the operator desires. Additionally, the interrupt assignment procedure conducted on the fish-finder node 76 does not disturb the communications among the other terminal nodes 42A, 42B, 48, 56, 62, 70 by any significant degree because the interrupt operation is achieved within a very short time period.

The terminal nodes can include nodes other than the drive nodes 42A, 42B, the velocity sensor node 48, the remote controller node 56, the steering node 62, the display node 70 and the fish-finder node 76. For example, terminal nodes for audio devices (e.g., stereos), audio-visual devices (e.g., TV-sets), navigation systems, telephones, telephone control devices and personal computers can be included.

The illustrated management node 82 is independently and separately provided from other nodes and is connected to the bus 80. In one variation of the illustrated network, the management node 82 can be replaced by a micro-computer or the like that is provided at either the velocity sensor node 48, the remote controller node 56, the steering node 62 or the display node 70, which is simultaneously turned on when the main switch unit is turned on. The micro-computer preferably is installed with at least the initial operation program 180 (FIG. 6) and the interrupt operation program 182 (FIG. 7).

Although this invention has been disclosed in the context of a certain preferred embodiment, variations thereof, and examples, it will be understood by those skilled in the art that the present invention extends beyond the specifically disclosed embodiments and variations to other embodiments and/or uses of the invention and obvious modifications and equivalents thereof apparent to those of ordinary skill in the art. In particular, while the present network has been described in the context of a particularly preferred embodiment, the skilled artisan will appreciate, in view of the present disclosure, that certain advantages, features and aspects of the network may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiment, variations and examples described above, but should be determined only by a fair reading of the claims of this patent.

What is claimed is:

1. A multiple node network comprising a plurality of terminal nodes, a management node at least initially managing the terminal nodes, and a bus arranged to connect the respective terminal nodes and the management node to one another, the terminal nodes and the management node communicating with one another using a respective frame that includes at least an identifier field and a data field, at least some of the terminal nodes transferring a frame to the management node in which the data field contains a discriminative code, the management node arbitrating a contention between one or more of terminal nodes by comparing the identifier field of one terminal node in contention with the identifier field of another terminal node in contention, and at least some of the terminal nodes being capable of calculating a time delay based upon at least a portion of the discriminative code in the data field when arbitration fails and re-transferring the frame to the management node after the time delay, wherein the network is configured at least to control a plurality of engines that power a wateraraft, at least two of the terminal nodes controlling the respective engines, each one of the terminal nodes that controls each one of the engines having the same identifier field and having a different discriminative code.

2. The network as set forth in claim 1, wherein at least two of the terminal nodes have the same identifier field as one another, and the arbitration fails when the terminal nodes having the same identifier field simultaneously transfers the respective frames.

3. The network as set forth in claim 1, wherein the data field selectively comprises a plurality of bits corresponding to the discriminative code, and said at least some of the terminal nodes calculate the respective time delay using some of the bits.

4. The network as set forth in claim 3, wherein the data field comprises a plurality of bit units, and said at least some of the terminal nodes selects one of the bit units at a time to calculate the time delay.

5. The network as set forth in claim 4, wherein the bit unit forms a byte.

6. A multiple node network comprising a plurality of terminal nodes, a management node at least initially managing the terminal nodes, and a bus arranged to connect the respective terminal nodes and the management node to one another, the terminal nodes and the management node communicating with one another using a respective frame that includes at least an identifier field and a data field, at least some of the terminal nodes transferring a frame to the management node in which the data field contains a discriminative code, the management node arbitrating a contention between one or more of terminal nodes by comparing the identifier field of one terminal node in contention with the identifier field of another terminal node in contention, and at least some of the terminal nodes being capable of calculating a time delay based upon at least a portion of the discriminative code in the data field when arbitration fails and re-transferring the frame to the management node after the time delay, wherein the data field selectively comprises a plurality of bits corresponding to the discriminative code, and said at least some of the terminal nodes calculate the respective time delay using some of the bits, wherein the data field comprises a plurality of bit units, and said at least some of the terminal nodes selects one of the bit units at a time to calculate the time delay, wherein the bit unit represents a numerical value, and said at least some of the terminal nodes multiplies the numerical value by a transfer time of one bit to calculate the time delay.

7. The network as set forth in claim 1, wherein each one of the terminal nodes transfers the frame to the management node to obtain a network address from the management node.

8. The network as set forth in claim 1, wherein said each one of the terminal nodes belongs to a component of a system, and the discriminative code includes a number allotted to the component.

9. The network as set forth in claim 8, wherein the number is any identifier selected from the group consisting of a product number, a part number, a manufacturing number and a manufacturer number for the component.

10. A multiple node network comprising a plurality of terminal nodes, each one of the terminal nodes communicating with a component of a system, a management node communicating with the terminal nodes, and a bus arranged to connect the terminal nodes and the management node to one another, the terminal nodes initially communicating with the management node using a frame that includes at least a data field having a discriminative number allotted to the component, at least some of the terminal nodes transferring the frame to the management node, and at least some of the terminal nodes capable of re-transferring the frame to the management node after a time delay that is calculated based upon at least a portion of the discriminative number when a plurality of the terminal nodes has simultaneously transferred the respective frames to the management node, the network configured at least to control a plurality of engines that power a watercraft with at least two of the terminal nodes controlling the respective engines, the discriminative number of each of the terminal nodes that controls each one of the engines being different from one another, and each of said terminal nodes that control the engines having an identifier field that is the same.

11. The network as set forth in claim 10, wherein the system is a vehicle, the component is a drive unit of the vehicle, and the discriminative number is any one of a product number, a parts number, a manufacturing number and a manufacturer number of the drive unit or a member related to the drive unit.

12. The network as set forth in claim 11, wherein the vehicle is a watereraft, and the drive unit is an outboard motor that propels the watercraft, the outboard motor has an engine as the member, and the discriminative number is any one of a product number, a parts number, a manufacturing number or a manufacturer number of the outboard motor or the engine.

13. The network as set forth in claim 10, wherein the data field comprises a plurality of bits corresponding to the discriminative number, at least some of the terminal nodes calculates the time delay using some of the bits.

14. A multiple node network comprising a plurality of terminal nodes, each one of the terminal nodes communicating with a component of a system, a management node communicating with the terminal nodes, and a bus arranged to connect the terminal nodes and the management node to one another, the terminal nodes initially communicating with the management node using a frame that includes at least a data field having a discriminative number allotted to the component, at least some of the terminal nodes transferring the frame to the management node, and at least some of the terminal nodes capable of re-transferring the frame to the management node after a time delay that is calculated based upon at least a portion of the discriminative number when a plurality of the terminal nodes has simultaneously transferred the respective frames to the management node, wherein at least some of the terminal nodes are further capable of repeatedly recalculating a time delay based upon at least another portion of the discriminative number and then re-transmitting the frame to the management node after the recalculated time delay until said terminal nodes no longer simultaneously transmits the respective frames to the management node.

15. A communication method between a plurality of nodes in a network configured at least to control a plurality of engines that power a watercraft, the nodes including terminal nodes and a management node configured to communicate with the terminal nodes, at least two of the terminal nodes controlling said plurality of engines, the method comprising creating a frame that includes at least an identifier field and a data field, the data field having a discriminative code, each one of the terminal nodes that controls each one of the engines having the same identifier field and having a different discriminative code, transferring the frame to the management node from at least a plurality of the terminal nodes, comparing the identifier field of one terminal node with the identifier field of another terminal node to arbitrate between the terminal nodes in contention when the terminal nodes simultaneously transfer the respective frames to the management node, determining whether the arbitration fails, re-sending the frames to the management node from the terminal nodes when the arbitration has failed, calculating a time delay based upon at least a portion of each one of the discriminative codes, and delaying the re-sending of the frames from each terminal node in contention by the calculated time delay.

16. The communication method as set forth in claim 15, wherein the data field includes a plurality of bits corresponding to the discriminative code, and calculating time delay using some of the bits.

17. The communication method as set forth in claim 16, wherein the data field includes a plurality of bit units, the method additionally comprising selecting one of the bit units to use in the calculation of the time delay.

18. A communication method between a plurality of nodes in a network, the nodes including terminal nodes and a management node configured to communicate with the terminal nodes, the method comprising creating a frame that includes at least an identifier field and a data field, the data field having a discriminative code, transferring the frame to the management node from at least a plurality of the terminal nodes, comparing the identifier field of one terminal node with the identifier field of another terminal node to arbitrate between the terminal nodes in contention when the terminal nodes simultaneously transfer the respective frames to the management node, determining whether the arbitration fails, re-sending the frames to the management node from the terminal nodes when the arbitration has failed, calculating a time delay based upon at least a portion of each one of the discriminative codes, and delaying the re-sending of the frames from each terminal node in contention by the calculated time delay, wherein the data field includes a plurality of bits corresponding to the discriminative code, and calculating time delay using some of the bits, the data field including a plurality of bit units, the method additionally comprising selecting one of the bit units to use in the calculation of the time delay, wherein the bit unit represents a numerical value, and the calculation of the delay time involves multiplying the numerical value by a transfer time of one bit.

19. A communication method between a plurality of nodes in a network, the nodes including terminal nodes and a management node configured to communicate with the terminal nodes, the method comprising creating a frame that includes at least an identifier field and a data field, the data field having a discriminative code, transferring the frame to the management node from at least a plurality of the terminal nodes, comparing the identifier field of one terminal node with the identifier field of another terminal node to arbitrate between the terminal nodes in contention when the terminal nodes simultaneously transfer the respective frames to the management node, determining whether the arbitration fails, re-sending the frames to the management node from the terminal nodes when the arbitration has failed, calculating a time delay based upon at least a portion of each one of the discriminative codes, and delaying the re-sending of the frames from each terminal node in contention by the calculated time delay, wherein the data field includes a plurality of bits corresponding to the discriminative code, and calculating a time delay using some of the bits, the data field including a plurality of bit units, the method additionally comprising selecting one of the bit units to use in the calculation of the time delay, the bit unit representing a numerical value, the calculation of the delay time involving multiplying the numerical value by a transfer time of one bit, wherein the terminal nodes belong to respective components of a system, the discriminative code includes a number allotted to each one of the components.

20. A communication method between a plurality of nodes in a network configured at least to control a plurality of engines that power a watercraft, the nodes including terminal nodes and a management node configured to communicate with the terminal nodes, each one of the terminal nodes belonging to a component of a system, at least two of the terminal nodes controlling the respective engines, the method comprising creating a frame that includes at least a data field having a discriminative number allotted to the component, each one of the terminal nodes that controls each one of the engines having an identifier field that is the same as one another and having a discriminative number that is different from one another, transferring the frame to the management node from at least some of terminal nodes, repeating the transferring of the frames to the management node from a plurality of terminal nodes when a contention arises that cannot be solved by arbitration, calculating a time delay based upon at least a portion of the discriminative number, and delaying the repeated transfer of the frames from the terminal nodes in contention by the calculated delay time.

21. The communication method as set forth in claim 20, wherein the system is a vehicle, the component is a drive unit of the vehicle, and creating the frame involves recalling the discriminative number from memory, where the discriminative number is either a parts number, a manufacturing number or a manufacturer number of the drive unit or a member related to the drive unit.

22. A communication method between a plurality of nodes in a network, the nodes including terminal nodes and a management node configured to communicate with the terminal nodes, each one of the terminal nodes belonging to a component of a system, the method comprising creating a frame that includes at least a data field having a discriminative number allotted to the component, transferring the frame to the management node from at least some of terminal nodes, repeating the transferring of the frames to the management node from a plurality of terminal nodes when a contention arises that cannot be solved by arbitration, calculating a time delay based upon at least a portion of the discriminative number, delaying the repeated transfer of the frames from the terminal nodes in contention by the calculated delay time, and repeatedly recalculating a time delay based upon at least another portion of the discriminative number and then re-transmitting the frame to the management node after the recalculated time delay until said terminal nodes in contention no longer simultaneously transmit the respective frames to the management node.

* * * * *

UNITED STATES PATENT AND TRADEMARK OFFICE
CERTIFICATE OF CORRECTION

PATENT NO. : 7,408,950 B2 Page 1 of 1
APPLICATION NO. : 10/619095
DATED : August 5, 2008
INVENTOR(S) : Takashi Okuyama It is certified that error appears in the above-identified patent and that said Letters Patent is hereby corrected as shown below:

At Drawing Sheet 8 of 9, line 3, please delete "arbitraion" and insert -- arbitration --, therefor.

At column 3, line 1, please delete "field-having" and insert -- field having --, therefor.

At column 4, line 2, please delete "bull" and insert -- hull --, therefor.

At column 6, line 16, please delete "protocal" and insert -- protocol --, therefor.

At column 7, line 57, please delete "protocal" and insert -- protocol --, therefor.

At column 16, line 13, please delete "Th" and insert -- Tb --, therefor.

At column 22, line 24, in Claim 1, please delete "watereraft," and insert -- watercraft, --, therefor.

At column 23, line 43, in Claim 12, please delete "watereraft," and insert -- watercraft, --, therefor.

Signed and Sealed this

Sixth Day of January, 2009

JON W. DUDAS
*Director of the United States Patent and Trademark Office*